US009782906B1

(12) United States Patent
Aminpour et al.

(10) Patent No.: US 9,782,906 B1
(45) Date of Patent: Oct. 10, 2017

(54) ON DEMAND APPAREL PANEL CUTTING

(71) Applicant: Amazon Technologies, Inc., Seattle, WA (US)

(72) Inventors: Rouzbeh Safavi Aminpour, Seattle, WA (US); Aaron Takayanagi Barnet, Seattle, WA (US); Nancy Yi Liang, Seattle, WA (US); Adam N. Alexander, Seattle, WA (US); James Richard Wilson, Seattle, WA (US); Javier Govea Mata, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/970,840

(22) Filed: Dec. 16, 2015

(51) Int. Cl.
*G06F 19/00* (2011.01)
*B26D 5/00* (2006.01)

(52) U.S. Cl.
CPC ............. *B26D 5/005* (2013.01); *B26D 5/007* (2013.01); *B26D 2005/002* (2013.01)

(58) Field of Classification Search
CPC ... B26D 5/005; B26D 5/007; B26D 2005/002
USPC .......................................................... 700/134
See application file for complete search history.

(56) References Cited

U.S. PATENT DOCUMENTS 4,178,820 A 12/1979 Gerber
5,132,505 A 7/1992 Zonneveld
5,172,326 A * 12/1992 Campbell, Jr. ...... B23K 26/032 700/134
5,254,833 A 10/1993 Okiyama
5,333,111 A 7/1994 Chaiken
5,418,711 A 5/1995 Pomerleau
5,709,506 A 1/1998 Beard et al.
5,791,215 A * 8/1998 Morrison ................. B26D 5/32 700/167
5,806,390 A 9/1998 Pomerleau
5,867,392 A 2/1999 Bousquet
(Continued)

FOREIGN PATENT DOCUMENTS

WO 2016/033367 3/2016

OTHER PUBLICATIONS

U.S. Appl. No. 14/970,874, filed Dec. 16, 2015, Office Action mailed on Aug. 11, 2016.
(Continued)

*Primary Examiner* — Nathan Durham
(74) *Attorney, Agent, or Firm* — Eversheds Sutherland (US) LLP

(57) ABSTRACT

Aspects of on demand apparel manufacturing are described. A system of on demand apparel manufacturing includes a textile cutter and a computing device. The computing device is configured to perform a process including capturing an image of a textile sheet on the textile cutter, where the textile sheet includes a panel for a product. The process further includes identifying cut control factors using the image of the textile sheet, to account for a textile thread, weave, nap, or knit pattern of the textile sheet, a textile print pattern alignment on the textile sheet, or panel deformation of the textile sheet on the textile cutter. The process also includes generating cut control instructions to cut the textile sheet based in part on the image and the cut control factors, and instructing the textile cutter to cut the panel out from the textile sheet based in part on the cut control instructions.

20 Claims, 13 Drawing Sheets

(56) References Cited

U.S. PATENT DOCUMENTS

| | | | | |
|---|---|---|---|---|
| 5,975,743 | A * | 11/1999 | Bercaits | B26D 5/00 700/134 |
| 6,028,320 | A | 2/2000 | Uhling | |
| 6,173,211 | B1 * | 1/2001 | Williams | A41H 3/08 700/131 |
| 6,349,241 | B1 * | 2/2002 | Peron | B26D 5/00 700/134 |
| 6,502,489 | B2 | 1/2003 | Gerent | |
| 6,520,057 | B1 | 2/2003 | Steadman | |
| 6,807,289 | B2 * | 10/2004 | Zink | B26D 5/00 382/111 |
| 6,836,694 | B1 | 12/2004 | Podubrin | |
| 8,428,767 | B2 * | 4/2013 | Tremoureux | B26D 5/00 700/134 |
| 8,731,703 | B1 * | 5/2014 | Lehrer | G06F 3/1257 700/132 |
| 2005/0065631 | A1 * | 3/2005 | Rapoza | B26D 5/00 700/135 |
| 2005/0240416 | A1 * | 10/2005 | Schindler | G06Q 10/06 700/131 |
| 2007/0107572 | A1 | 5/2007 | Pommier | |
| 2013/0144424 | A1 * | 6/2013 | Jarbouai | G06F 9/06 700/134 |
| 2013/0261785 | A1 * | 10/2013 | Crary | D06C 11/00 700/141 |
| 2014/0277663 | A1 | 9/2014 | Gupta et al. | |
| 2014/0277683 | A1 * | 9/2014 | Gupta | G06F 17/50 700/132 |
| 2015/0066189 | A1 * | 3/2015 | Mulligan | G06F 3/04815 700/136 |

OTHER PUBLICATIONS

U.S. Appl. No. 14/970,840, filed Dec. 16, 2015, Notice of Allowance mailed on Mar. 37, 2017.

U.S. Appl. No. 14/970,874, filed Dec. 16, 2015, Response to Non-Final Office Action mailed on Aug. 11, 2016.

U.S. Appl. No. 15/069,855, filed Mar. 14, 2016, Non-Final Office Action dated May 19, 2017.

PCT Patent Application PCT/US17/016802 filed on Feb. 7, 2017, Notification of Transmittal of the International Search Report and the Written Opinion of the International Searching Authority, or the Declaration dated May 10, 2017.

PCT Patent Application PCT/US17/020334 filed on Mar. 2, 2017, Notification of Transmittal of the International Search Report and the Written Opinion of the International Searching Authority, or the Declaration dated Jun. 8, 2017.

* cited by examiner

ON DEMAND APPAREL PANEL CUTTING

BACKGROUND

The apparel manufacturing, retailing, and fitting industries include a diverse range of parties, such as designers, fabric manufacturers, apparel cutting and sewing workers, apparel retailers, tailors, and cleaners. The apparel manufacturing industry relies upon various resources, processes, and equipment to produce finished garments, accessories, footware, etc. Generally, a process to manufacture a garment includes garment design, fabric production and/or printing, and panel cutting and sewing. Many aspects of apparel manufacturing processes are relatively time consuming and require the coordination of many different geographically-dislocated suppliers, vendors, manufacturers, and retailers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
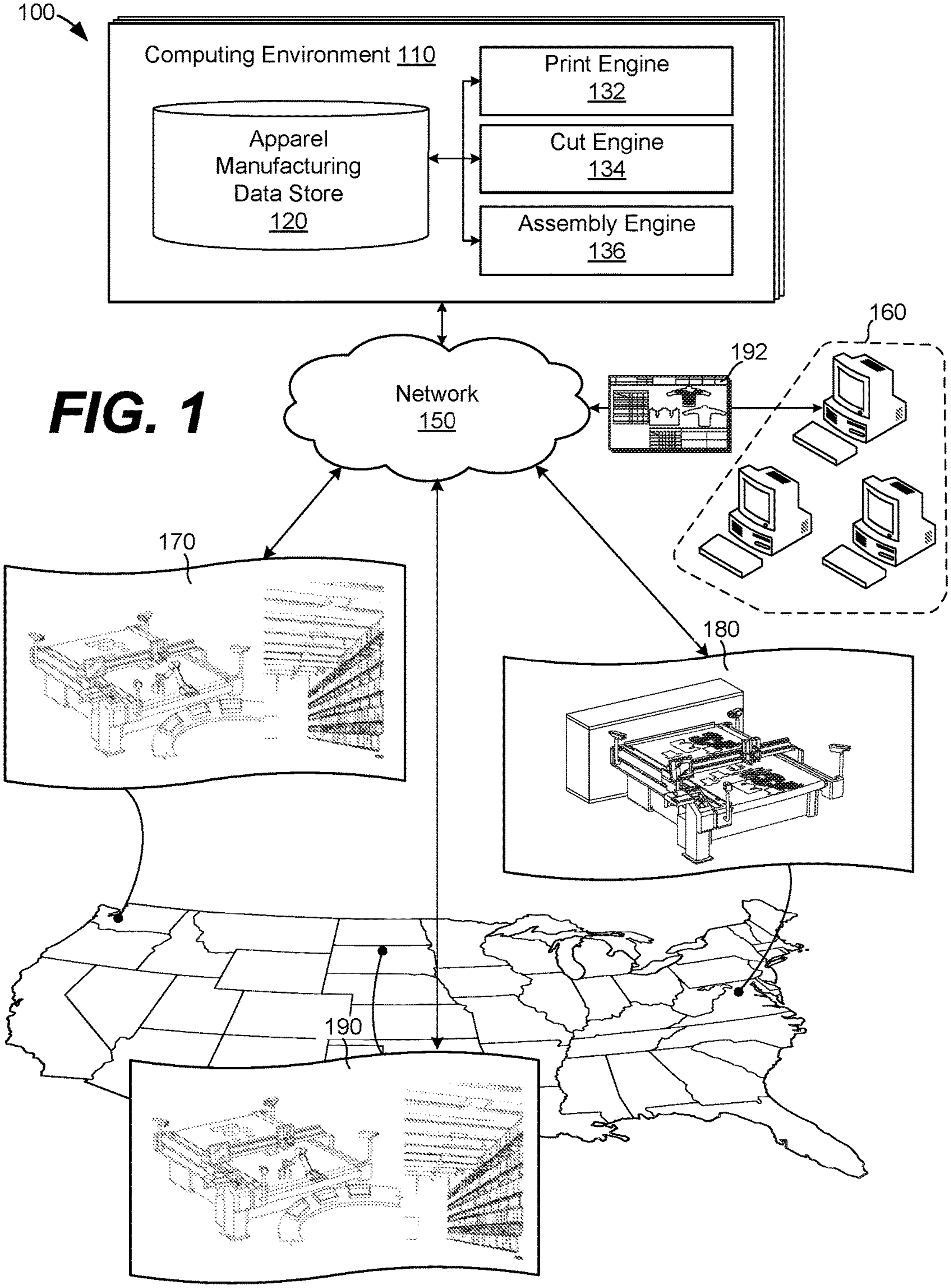
FIG. 1 illustrates a networked environment for on demand apparel manufacturing according to various embodiments of the present disclosure.

Aspects of on demand apparel manufacturing are described herein. In one embodiment, a system includes a textile printer, a textile cutter, a textile assembly production line, and a coordinating computing environment or device. The computing environment performs an on demand apparel manufacturing process using the textile printer, the textile cutter, and the textile assembly production line, among other resources.

The on demand apparel manufacturing process includes collecting or aggregating orders for textile products from various client devices. The orders can be collected by the computing environment, in the form of tech packs, over time from various geographic locations. The orders in the tech packs can be organized by the computing environment into one or more groups of orders based on one or more productivity factors, such as size, shape, fabric type, or delivery location for the textile products, among other factors. The computing environment then aggregates panels for textile products in the groups of orders into aggregated textile panel templates. The panels can be aggregated in the templates by the computing environment to reduce scrap in textile sheets by tightly aligning or orienting the panels onto the textile sheets.

The computing environment then instructs a textile printer to print the panels in an aggregated textile panel template on one or more textile sheets. The panels can be printed in any needed shape or form and may include various types of print patterns defined in the orders. Once the panels are printed by the textile printer, the computing environment then instructs the textile cutter to cut the panels out from the textile sheets.

Using the panels cut out from the textile sheets, the computing environment generates instructions for the assembly of the textile products defined in the orders and coordinates an efficient assembly process for the products. According to aspects of the embodiments, the computing environment generates and provides assembly instructions to a textile assembly production line. Based on the assembly instructions, the textile assembly production line directs the panels to various sewing stations, for example, for assembly. Once various textile products are printed, cut, and assembled according to the orders, they can be processed through a quality check, photographed for placement in an electronic commerce system, shipped to customers, and/or stored in a materials handling facility for order fulfillment. By aggregating orders from various geographic locations and coordinating apparel assembly processes on a large scale, the embodiments provide new ways to increase efficiency in apparel manufacturing.

In other aspects of the embodiments, the computing environment monitors and controls cutting operations performed by the textile cutter. For example, the computing environment can capture images of one or more panels printed on a textile sheet during a cutting process performed by a textile cutter. To effectively cut the textile sheet using the textile cutter, the process includes identifying factors to control the cut of the textile sheet, during cutting, using the images of the textile sheet. Using the images, a textile thread, weave, nap, or knit pattern of the textile sheet, a textile print pattern alignment on the textile sheet, or a panel deformation of the textile sheet on the textile cutter, for example, can be identified and accounted for during cutting. The computing environment can also generate and adapt cut control instructions based on the images, during cutting. By capturing images of a textile sheet after panels and/or print patterns have been printed on it, and adjusting the cut control instructions using feedback gathered from images captured while the textile sheet is being cut, the embodiments described herein provide new ways to increase efficiency in apparel manufacturing.

Before turning to the figures, although the description of the embodiments is generally provided in the context of the manufacture of apparel or textile products below, it is noted that the embodiments are not limited to the manufacture of any particular type(s) of textile, fabric, or clothing products from any particular type(s) of materials. Instead, the embodiments described herein can be applied to the manufacture of a wide array of products, including clothing or fabric products, accessories (e.g., scarves, gloves, hats, bags, belts, etc.), footwear, bedding, curtains, towels, etc., in a wide variety of materials, including but not limited to paper, plastic, leather, rubber, and other materials.

Turning to the figures, FIG. 1 illustrates a networked environment 100 for on demand apparel manufacturing according to various embodiments of the present disclosure. The networked environment 100 includes a computing environment 110. The computing environment 110 includes an apparel manufacturing data store 120, a print engine 132, a cut engine 134, and an assembly engine 136. The networked environment 100 further includes a network 150, client devices 160, and apparel manufacturing and/or fulfillment facilities 170, 180, and 190 (collectively "facilities 170, 180, and 190"; individually "facility 170," "facility 180," or "facility 190"). As illustrated in FIG. 1, the facilities 170, 180, and 190 are located at different geographic locations. In the networked environment 100, the computing environment 110 is configured to perform an on demand apparel manufacturing process using textile printers, textile cutters, textile production lines, and/or other equipment or resources at the facilities 170, 180, and 190.

The networked environment 100 illustrated in FIG. 1 is provided by way of example. The relative locations of the computing environment 110, the client devices 160, and the facilities 170, 180, and 190 are representative in FIG. 1, and the embodiments can be organized and/or distributed in other ways than that shown.

In the networked environment 100, the computing environment 110 can be, in part or in its entirety, geographically dislocated from the facilities 170, 180, and 190, while controlling and/or directing the overall operation of the equipment in the facilities 170, 180, and 190 via the network 150. Thus, the network 150 facilitates two-way data and control communications between the computing environment 110 and the textile printers, textile cutters, textile production lines, and other equipment in the facilities 170, 180, and 190. As described below, one or more of the textile printers, textile cutters, textile production lines, and other equipment in the facilities 170, 180, and 190 can also include embedded control system(s), respectively. As referred to herein, the computing environment 110 can encompass, at least in part, the hardware and software logic of one or more of the embedded control system(s) of the textile printers, textile cutters, textile production lines, and other equipment in the facilities 170, 180, and 190.

In operation, the computing environment 110 is configured to collect orders for products, such as textile, paper, plastic, leather, rubber, etc. products, from the client devices 160. The orders can be received over time via the network 150 in the form of (or along with) tech packs 192, for example, and stored in the apparel manufacturing data store 120 for further processing by the computing environment 110. The tech packs 192 can be embodied as digital or electronic files, such as job definition format (JDF) or other types of files, that define instructions to manufacture one or more products at the facilities 170, 180, and 190. In that context, the tech packs 192 can include a definition of one or more fabrics or fabric specifications, one or more panels (e.g., fabric sections, portions, or parts), fabric colors, fabric print patterns or graphics, thread, weave, nap, or knit or embroidery patterns, assembly instructions, fastener definitions and/or specifications, quantities, price and/or cost limitations or requests, and other specifications of textile or other products.

Once received, the computing environment 110 is configured to organize orders defined by the tech packs 192 into one or more groups of orders based on one or more productivity or efficiency factors, such as size, shape, fabric type, delivery location, etc. of the products defined by the tech packs 192. For example, if a number of the orders specify fulfillment in the geographic location surrounding Seattle, Wash., the computing environment 110 may organize those orders into a group of orders for manufacture and/or fulfillment at the facility 170. As another example, if a number of the orders specify products for manufacture using a type of fabric only available at the facility 190, the computing environment 110 may organize those orders into a group of orders for manufacture and/or fulfillment at the facility 190. Generally, by aggregating orders from several client devices 160 and coordinating apparel manufacture and assembly processes on a relatively large scale, the networked environment 100 provides new ways to increase efficiency in apparel manufacturing.

After the orders defined by the tech packs 192 are aggregated and organized into one or more groups of orders, the print engine 132 of the computing environment 110 is configured to arrange panels for products in a group of orders into one or more aggregated textile panel templates. In that context, it is noted that the embodiments described herein facilitate the manufacture of textile products that incorporate certain print patterns defined in the tech packs 192. Examples of aggregated textile panel templates are described in further detail below with reference to FIGS. 5A and 5B. The panels in an aggregated textile panel template can be representative of one or more sections or portions of fabric or other materials for one or more shirts, pants, dresses, or other accessories or items.

The print engine 132 can aggregate the panels in the aggregated textile panel templates for efficiency. For example, across orders defined by multiple tech packs 192, all panels to be cut out from the same type of fabric can be incorporated and aligned in the same aggregated textile panel template. In that way, fabric scrap can be reduced by aggregating and aligning multiple panels across orders defined by a number of tech packs 192. As described in further detail below, the computing environment 110 is configured to assign unique identifiers for each panel in the aggregated textile panel templates to identify and distinguish them from each other and, in some cases, print machine-readable representations of those unique identifiers on textile sheets along with the panels.

The print engine 132 of the computing environment 110 is also configured to instruct a textile printer at one of the facilities 170, 180, or 190 to print the panels in the aggregated textile panel templates on one or more textile sheets. The panels can be printed in any shape or form necessary, and the panels can be printed to include various types of print patterns defined in the orders. Examples of textile printers are described in further detail below with reference to FIG. 3.

Once the panels are printed by a textile printer at one of the facilities 170, 180, or 190, the cut engine 134 of the computing environment 110 is configured to instruct a textile cutter at the one of the facilities 170, 180, or 190 to cut the panels out from the textile sheets. At the same time, the cut engine 134 is configured to monitor and control the cutting operations performed by the textile cutter. For example, the cut engine 134 is configured to capture images of one or more panels during a cutting process performed by a textile cutter. To effectively cut the textile sheet using the textile cutter, the cut engine 134 is configured to identify factors to control the cut of the textile sheet, before and during cutting, using the images of the textile sheet. Using the images, a textile thread, weave, nap, or knit pattern of the textile sheet, a textile print pattern alignment on the textile sheet, or a panel deformation of the textile sheet on the textile cutter, for example, can be identified and accounted for by the cut engine 134 during cutting. Particularly, the cut engine 134 can adapt cut control instructions for the textile cutter based on an analysis of the images. By capturing images of a textile sheet after panels and/or print patterns have been printed on it and adjusting the cut control instructions using feedback gathered from images captured while the textile sheet is being cut, the cut engine 134 can reduce cut errors, reduce waste, and increase efficiency in apparel manufacturing. Examples of textile cutters and the generation of cut control instructions are described in further detail below with reference to FIGS. 6 and 7.

Using the panels cut out from the textile sheets, the assembly engine 136 of the computing environment 110 is configured to generate instructions for the assembly of the textile products defined in the orders from the client devices 160. The assembly engine 136 is further configured to coordinate an efficient assembly process for the products. For example, the assembly engine 136 is configured to generate and provide assembly instructions to a textile assembly production line. Based on the assembly instructions, the textile assembly production line directs various panels to sewing stations, for example, for assembly. Examples of a textile assembly production line and the generation of instructions for the assembly of textile products are described in further detail below with reference to FIG. 8.

Once panels for various products are printed, cut, and assembled according to the orders from the client devices 160, they can be processed through a quality check, photographed for placement (e.g., sale) in an electronic commerce system, shipped to customers, and/or stored in the facilities 170, 180, and 190 for order fulfillment. By aggregating orders from various geographic locations and coordinating apparel assembly processes on a large scale, the networked environment 100 provides new ways to increase efficiency in apparel manufacturing.

Figure 2:
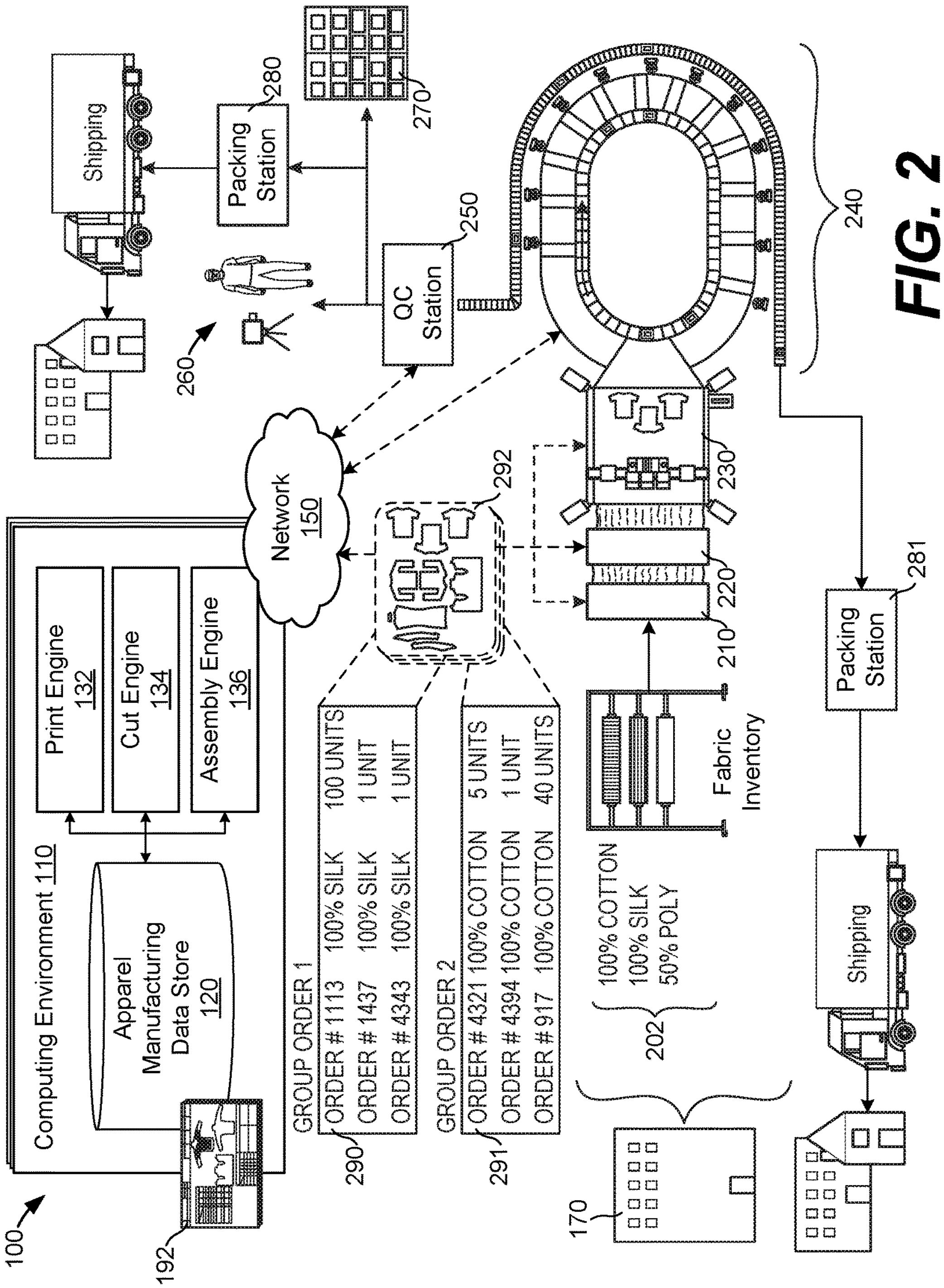
FIG. 2 illustrates a more detailed view of the networked environment for on demand apparel manufacturing shown in FIG. 1 according to various embodiments of the present disclosure.

Turning to FIG. 2, a more detailed view of the networked environment 100 in FIG. 1 is illustrated. In addition to the computing environment 110 and the network 150 shown in FIG. 1, FIG. 2 further illustrates equipment and other resources for on demand apparel manufacturing at the facility 170. As shown in FIG. 2, the facility 170 includes fabric inventory 202, a textile printer 210, a textile dryer 220, a textile cutter 230, and a textile production line 240. FIG. 2 also illustrates a quality control (QC) station 250, a photography station 260, a binning station 270, and packing stations 280 and 281 in the facility 170. Additionally, FIG. 2 also illustrates example groups of orders 290 and 291 and example aggregated textile panel templates 292.

The fabric inventory 202 can be embodied as an inventory of fabric, including one or more textile rolls or sheets of various grades and types of fabric. In that context, the fabric inventory 202 can include fabrics that are woven, non-woven, knitted, netted, technical, etc., without limitation. As shown in FIG. 2, for example, the fabric inventory 202 includes solid and patterned cotton, silk, and polyester blend fabric rolls, although the use of other types of fabric (e.g., linen, wool, nylon, etc.) are within the scope of the embodiments. Other types of materials can also be kept in inventory, such as paper, plastic, leather, rubber, and other materials. According to aspects of the embodiments, the apparel manufacturing data store 120 can store records of the fabric inventory 202 available for processing at the facility 170, along with the specifications of the fabric inventory 202. As described in further detail below, the print engine 132 and the cut engine 134 are configured to account for the specifications, such as material type, thread count, thread, weave, nap, or knit pattern(s), thickness, stretch properties, etc. of the individual types of fabric (and any other materials) in the fabric inventory 202 when arranging panels on the aggregated textile panel templates 292 and/or generating cut control instructions for the textile cutter 230.

The textile printer 210 can be embodied as any suitable type of printer for printing on textile fabrics or other materials. Textile printing is related to textile dyeing but, rather than uniformly dyeing a fabric sheet in its entirety, textile printing involves applying one or more colors to only certain parts or areas of the fabric sheet, often in sharply defined patterns. The textile printer 210 may be embodied, for example, as a digital textile printer, digital garment printer, or direct-to-garment printer. The textile printer 210 can use specialized inkjet technologies, for example, to apply ink directly on fabrics in the fabric inventory 202. The textile printer 210 can apply water-based, acid, reactive, or other types of inks depending upon the type of fabric or other material being printed upon.

As described in further detail below, the textile printer 210 can receive instructions from the print engine 132 over the network 150 for printing various panels of products, panel cutouts for the panels, unique identifiers for the panels, cut alignment markers for the panels, assembly instructions for the panels, and other print features. Examples of those panels, panel cutouts, unique identifiers, cut alignment markers, assembly instructions, etc. are described in further detail below with reference to FIGS. 5A, 5B, and 7. The panels, panel cutouts, unique identifiers, cut alignment markers, assembly instructions, etc. may be defined in the aggregated textile panel templates 292 by the print engine 132. As described herein, after collecting orders defined by the tech packs 192, the print engine 132 can aggregate the orders into one or more groups of orders, such as the groups of orders 290 and 291. Any given groups of orders 290, 291, etc. can be associated with one or more of the aggregated textile panel templates 292 and stored in the apparel manufacturing data store 120 for further processing.

The textile dryer 220 can be embodied as any suitable type of dryer for drying ink printed on textile fabrics or other materials. The textile dryer 220 can include adjustable infrared or heat panels, for example, to dry or cure ink applied by the textile printer 210, as needed. In some embodiments, the textile dryer 220 may not be necessary based on the printing/ink technology used by the textile printer 210. Thus, the textile dryer 220 may be omitted and/or incorporated with the textile printer 210 in some embodiments. The operation of the textile dryer 220 can be controlled by the print engine 132 over the network 150, as needed.

The textile cutter 230 can be embodied as any suitable type of cutter, cutting table, or cutting machine. For cutting and manipulating various types of fabrics in the fabric inventory 202 and other materials, the textile cutter 230 can include one or more drag knives, wheel knives, laser knives, pneumatic and/or electric oscillating cutting knives and/or tools, pneumatic and/or electric rotary cutting knives and/or tools, scoring tools, v-cutting (e.g., scissor-type) tools, partout tools, creasing tools, routing and/or engraving tools, and other types of tools. The textile cutter 230 can include adjustable vacuums, rollers, clips, hold-downs, etc., to hold and/or maneuver textile sheets and other materials fed into the textile cutter 230 for cutting.

The cut engine 134 is configured to generate cut control instructions for the textile cutter 230, and the cut control instructions can be communicated to the cut engine 134 as part of two-way control communications over the network 150. The generation of cut control instructions by the cut engine is described in further detail below with reference to FIGS. 6 and 7.

In one embodiment, textile sheets printed by the textile printer 210 can be fed directly into the textile dryer 220 and, subsequently, the textile cutter 230. In other embodiments, the textile sheets can be manually moved and fed from the textile printer 210, to the textile dryer 220, and to the textile cutter 230.

The textile production line 240 can be embodied as an arrangement of one or more conveyors, totes, sewing or assembly stations, and associated drive and control systems. Once panels are cut out from the textile sheets by the textile cutter 230, the panels can be placed into one or more totes of the textile production line 240 for routing along its conveyor system to the sewing or assembly stations. Depending upon the type of the orders being processed, the assembly engine 136 is configured to generate instructions for placing the panels into the totes. The assembly engine 136 is further configured to generate instructions for directing the totes along the conveyor system of the textile production line 240.

For example, if one item, such as a dress, is being assembled for an order, the assembly engine 136 can generate instructions to place all panels for the dress into one tote and direct the tote along the conveyor system to a single sewing station for assembly. The assembly engine 136 can also compile and forward assembly instructions to that sewing station, for presentation on a monitor visible by an attendant, for example. Alternatively, if several jackets are being assembled, the assembly engine 136 can generate instructions to place several panel-pairs (i.e., panels that are to be sewn together) into a tote and direct the tote along the conveyor system to a single sewing station for assembly. At the sewing station, an attendant and/or automated sewing machine can assemble each of the panel-pairs, and the assembly engine 136 can generate further instructions to direct the assembled panel-pairs to another sewing station along the conveyor system for additional steps in the assembly of the jackets. Additional examples of the textile production line 240 and the generation of assembly instructions by the assembly engine 136 are described in further detail below with reference to FIGS. 8 and 9.

The QC station 250 can be embodied as a station to assess the quality of the products manufactured at the facility 170. In some embodiments, the computing environment 110 monitors and tracks the ongoing operations of the textile printer 210, textile dryer 220, textile cutter 230, and textile production line 240. If errors or potential errors in printing, cutting, or assembling one or more products are identified based on control feedback from the textile printer 210, textile dryer 220, textile cutter 230, or textile production line 240 to the computing environment 110 over the network 150, the computing environment 110 can flag those items for a further inspection or review at the QC station 250.

The photography station 260 can be embodied as a photography booth, stage, or setup for taking photographs of the products manufactured at the facility 170. Thus, the products manufactured at the facility 170 can be photographed for placement in an electronic commerce system. The products can also be stored in a materials handling area 270 of the facility 170, packaged for shipping at the packing station 280, and directly shipped to customers and/or retailers. In some cases, one or more products can be taken directly off the textile production line 240, packed at the packing station 281, and directly shipped to customer locations and/or retailers, bypassing the QC station 250 and/or the photography station 260.

Figure 3:
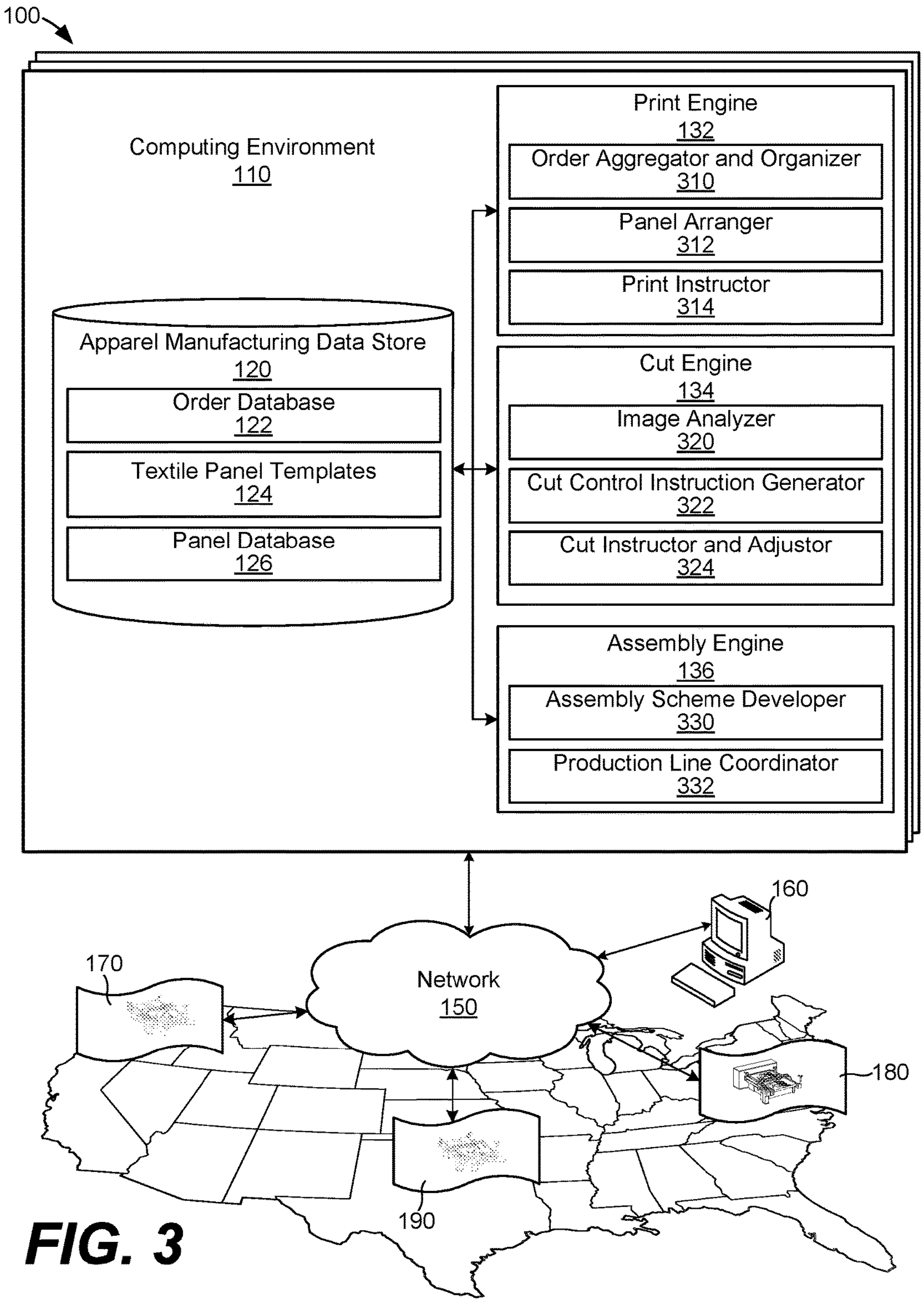
FIG. 3 illustrates a more detailed view of a computing environment for demand apparel manufacturing shown in FIGS. 1 and 2 according to various embodiments of the present disclosure.

FIG. 3 illustrates a more detailed view of a computing environment 110 for on demand apparel manufacturing shown in FIGS. 1 and 2 according to various embodiments of the present disclosure. The computing environment 110 may be embodied as one or more computers, computing devices, or computing systems. In certain embodiments, the computing environment 110 may include one or more computing devices arranged, for example, in one or more server or computer banks. The computing device or devices may be located at a single installation site or distributed among different geographical locations, including one or more of the facilities 170, 180, and 190. The computing environment 110 may include a plurality of computing devices that together embody a hosted computing resource, a grid computing resource, and/or other distributed computing arrangement. In some cases, the computing environment 110 may be embodied as an elastic computing resource where an allotted capacity of processing, network, storage, or other computing-related resources varies over time.

The computing environment 110 may also be embodied, in part, as various functional and/or logic (e.g., computer-readable instruction, device, circuit, processing circuit, etc.) elements configured to direct the computing environment 110 to perform aspects of the embodiments described herein. Additionally, to the extent that it interfaces over the network 150 with computing and/or control devices of the textile printer 210, textile dryer 220, textile cutter 230, and textile production line 240 (FIG. 2) through service interfaces, application programming interfaces (APIs), etc., the computing environment 110 can be embodied as a collection of computing devices that includes the computing and/or control devices (or capabilities) of the textile printer 210, textile dryer 220, textile cutter 230, and textile production line 240.

The network 150 may include the Internet, intranets, extranets, wide area networks (WANs), local area networks (LANs), wired networks, wireless networks, cable networks, satellite networks, other suitable networks, or any combinations thereof. It is noted that the computing environment 110 may communicate with the computing and/or control devices of the textile printer 210, textile dryer 220, textile cutter 230, and textile production line 240 (FIG. 2) in the facilities 170, 180, and 190 using various systems interconnect models and/or protocols such as simple object access protocol (SOAP), representational state transfer (REST), real-time transport protocol (RTP), user datagram protocol (UDP), internet protocol (IP), transmission control protocol (TCP), and/or other protocols for communicating data over the network 150, without limitation. It is noted that the network 150 may include connections to any number of client devices or network hosts, such as the client devices 160 (FIG. 1), website servers, file servers, networked computing resources, databases, data stores, or any other network devices or computing systems.

The client devices 160 can be embodied as any type of computing device, processing circuit, or processor based device or system used by individuals, including those embodied in the form of a desktop computer, a laptop computer, a personal digital assistant, a cellular telephone, or a tablet computer, among others. The client device 160 may also include one or more peripheral devices. In this context, the peripheral devices may include one or more input devices, such as a keyboard, keypad, touch pad, touch screen, microphone, camera, etc.

As shown in FIG. 3, the apparel manufacturing data store 120 includes an order database 122, textile panel templates 124, and a panel database 126. The print engine 132 includes an order aggregator and organizer 310, a panel arranger 312, and a print instructor 314. The cut engine 134 includes an image analyzer 320, a cut control instruction generator 322, and a cut instructor and adjustor 324. Further, the assembly engine 136 includes an assembly scheme developer 330, and a production line coordinator 332.

The order database 122 includes a database of all orders for textile products received from the client devices 160 (FIG. 1). In that context, the order database 122 can include a database of the tech packs 192, for example, along with any other specifications, quantities, price and/or cost limitations or requests, and other information associated with orders. The textile panel templates 124 can include a database of the aggregated textile panel templates 292 (FIGS. 2, 5A, 5B) generated by the panel arranger 312, as described herein. The panel database 126 can include a database of all the individual panels in the aggregated textile panel templates 292, along with unique identifiers for those panels, assembly instructions associated with those panels, and other information. The apparel manufacturing data store 120 is not limited to storing the information described above, as other data for the processes of on demand apparel manufacturing described herein, such as the fabric inventory 202 (FIG. 2) at the facility 170 (and similar inventory at the facilities 180 and 190), for example, can also be stored in the data store 120 among other relevant information.

Turning to the print engine 132, the order aggregator and organizer 310 is configured to organize orders received from the client devices 160 into one or more groups of orders (e.g., the groups of orders 290 and 291 in FIG. 2) based on one or more productivity or efficiency factors, such as size, shape, fabric type, delivery location, etc. of the products defined by the orders, with reference to the tech packs 192 that define the specifications of the orders. For example, if a number of the orders specify fulfillment in the geographic location surrounding Seattle, Wash., the computing environment 110 may organize those orders into a group of orders for manufacture and/or fulfillment at the facility 170. As another example, if a number of the orders specify textile products for manufacture using a type of fabric only available at the facility 190, the computing environment 110 may organize those orders into a group of orders for manufacture and/or fulfillment at the facility 190. Generally, by aggregating orders from several client devices 160 and coordinating apparel manufacture and assembly processes on a relatively large scale, the networked environment 100 provides new ways to increase efficiency in apparel manufacturing.

The panel arranger 312 is configured to arrange panels for textile products contained in a group of orders (e.g., one of the groups of orders 290 or 291 in FIG. 2) into one or more aggregated textile panel templates, such as the aggregated textile panel templates 292 shown in FIG. 2. The panels in an aggregated textile panel template can be representative of one or more sections or portions of fabric or other materials for one or more shirts, pants, dresses, or other accessories or items to be manufactured. In one embodiment, when arranging panels, the panel arranger 312 is configured to closely align the panels among each other to the extent possible to reduce scrap in textile sheets. Additionally or alternatively, the panel arranger 312 is configured to orient panels in the aggregated textile panel templates to align with a thread, weave, nap, knit or print pattern(s) in textile sheets. In other words, to the extent that a tech pack 192 specifies an orientation of a panel against a thread, weave, nap, knit, or print pattern(s) of a textile sheet, the panel arranger 312 can orient the panels accordingly.

The panel arranger 312 is also configured to assign unique identifiers for each panel in the aggregated textile panel templates and store those identifiers in the panel database 126 for reference by the computing environment 110. In other aspects of the embodiments, the panel arranger 312 can incorporate other features related to the panels in the aggregated textile panel templates, such as panel cutouts for the panels, the unique identifiers for the panels (e.g., serial numbers), machine-readable representations (e.g., bar codes, quick response codes, etc.) of the unique identifiers, cut alignment markers for the panels, assembly instructions for the panels, and other features.

In one embodiment, the panel arranger 312 is configured to generate the aggregated textile panel templates in a machine-readable computer-aided-manufacturing (CAM) or similar file format. In that case, the aggregated textile panel templates can be provided, in relevant part(s), as instructions from the computing environment 110 to one or more of the textile printer 210, the textile dryer 220, the textile cutter 230, or the textile production line 240 over the network 150.

The print instructor 314 is configured to coordinate the printing operations of textile printers, such as the textile printer 210 in the facility 170 (FIG. 2), over the network 150. For example, the print instructor 314 can forward one or more of the aggregated textile panel templates 292 to the textile printer 210 shown in FIG. 2. Additionally, the print instructor 314 is configured to monitor the ongoing printing operations of the textile printer 210. In that context, the print instructor 314 can identify printing errors, printing delays, and other printing-related activities and factors at the textile printer 210 based on the two-way data and control communications between the computing environment 110 and the textile printer 210. In that way, the print instructor 314 can coordinate printing operations along with the cutting operations directed by the cut engine 134 and the assembling operations directed by the assembly engine 136.

Turning to the cut engine 134, the image analyzer 320 is configured to capture images of one or more panels printed on a textile sheet (or sheet of another material) during the cutting processes performed by the textile cutter 220 (FIG. 2). In that context, as described in further detail below with reference to FIGS. 6 and 7, the textile cutter 220 includes an arrangement of cameras to capture images of textile sheets being cut by the textile cutter 220. Using the images of textile sheets, the image analyzer 320 is configured to identify factors to control the cut of the textile sheet. For example, a textile thread, weave, nap, or knit of the textile sheet, textile print pattern alignment on the textile sheet, or panel deformation of the textile sheet, for example, can be identified by the image analyzer 320. The image analyzer 320 can also identify certain features printed on the textile sheets by the textile printer 210, such as panel cutouts for the panels, machine-readable representations (e.g., bar codes, quick response codes, etc.) of the unique identifiers, cut alignment markers for the panels, and other features.

Based on the analysis performed by the image analyzer 320, the cut control instruction generator 322 can generate cut control instructions to cut out the panels from the textile sheets. The cut control instructions can be generated in the form of a CAM or similar file format for processing by the textile cutter 230. In the generation of cut control instructions, the cut control instruction generator 322 can refer to various types of information. For example, the cut control instruction generator 322 can refer to the analysis performed by the image analyzer 320, the aggregated textile panel templates used to print panels, the specifications of the textile sheets (e.g., the type, thickness, grade, weave pattern, thread count, etc.) being cut, and other factors.

After they are generated, the cut instructor and adjustor 324 can forward the cut control instructions to the textile cutter 230 (FIG. 2) over the network 150. The cut instructor and adjustor 324 is also configured to adapt the cut control instructions, over time and during cutting operations, based on the analysis performed by the image analyzer 320. By capturing images of textile sheets after panels and/or print patterns have been printed on them and adjusting the cut control instructions provided to the textile cutter 230 using feedback gathered from images, the cut instructor and adjustor 324 can dynamically adjust the cutting operations performed by the textile cutter 230.

Turning to the assembly engine 136, the assembly scheme developer 330 is configured to generate an assembly scheme including an ordered set of instructions for the assembly of products. Depending upon the type of the orders being processed, the assembly scheme developer 330 is configured to generate instructions for placing the panels into the totes. Where a textile production line, such as the textile production line 240 (FIG. 2), is relied upon for the assembly of textile and/or other products, the assembly scheme developer 330 is further configured to generate instructions for directing panels cut out from the textile sheets and/or other sheets of material(s) to various stations for sewing and/or assembly. In that context, the assembly scheme developer 330 can generate instructions for directing totes along the conveyor system of the textile production line 240.

As an example, if one item, such as a dress, is being assembled for an order, the assembly scheme developer 330 can generate an assembly scheme including instructions to place all panels for the dress into one tote and direct the tote along the conveyor system of the textile production line 240 to a single sewing station for assembly. Alternatively, if several jackets are being assembled, the assembly scheme developer 330 can generate an assembly scheme including instructions to place several panel-pairs (i.e., panels that are to be directly sewn together) into a tote and direct the tote along the conveyor system to a single sewing station for assembly. At the sewing station, an attendant and/or automated sewing machine can assemble each of the panel-pairs, and the assembly scheme developer 330 can generate further instructions to direct the assembled panel-pairs to another sewing station along the conveyor system for additional steps in the assembly of the jackets.

Referring to the assembly schemes generated by the assembly scheme developer 330, the production line coordinator 332 is configured to forward the instructions to the textile production line 240 and monitor the overall operations of the textile production line 240 during the assembly processes. The assembly schemes and associated instructions can be communicated to the textile production line 240 as part of two-way control communications between the assembly engine 136 and the textile production line 240 (FIG. 2) over the network 150. In turn, the textile assembly production line 240 directs various panels to sewing stations for assembly according to the direction provided by the production line coordinator 332.

Figure 4:
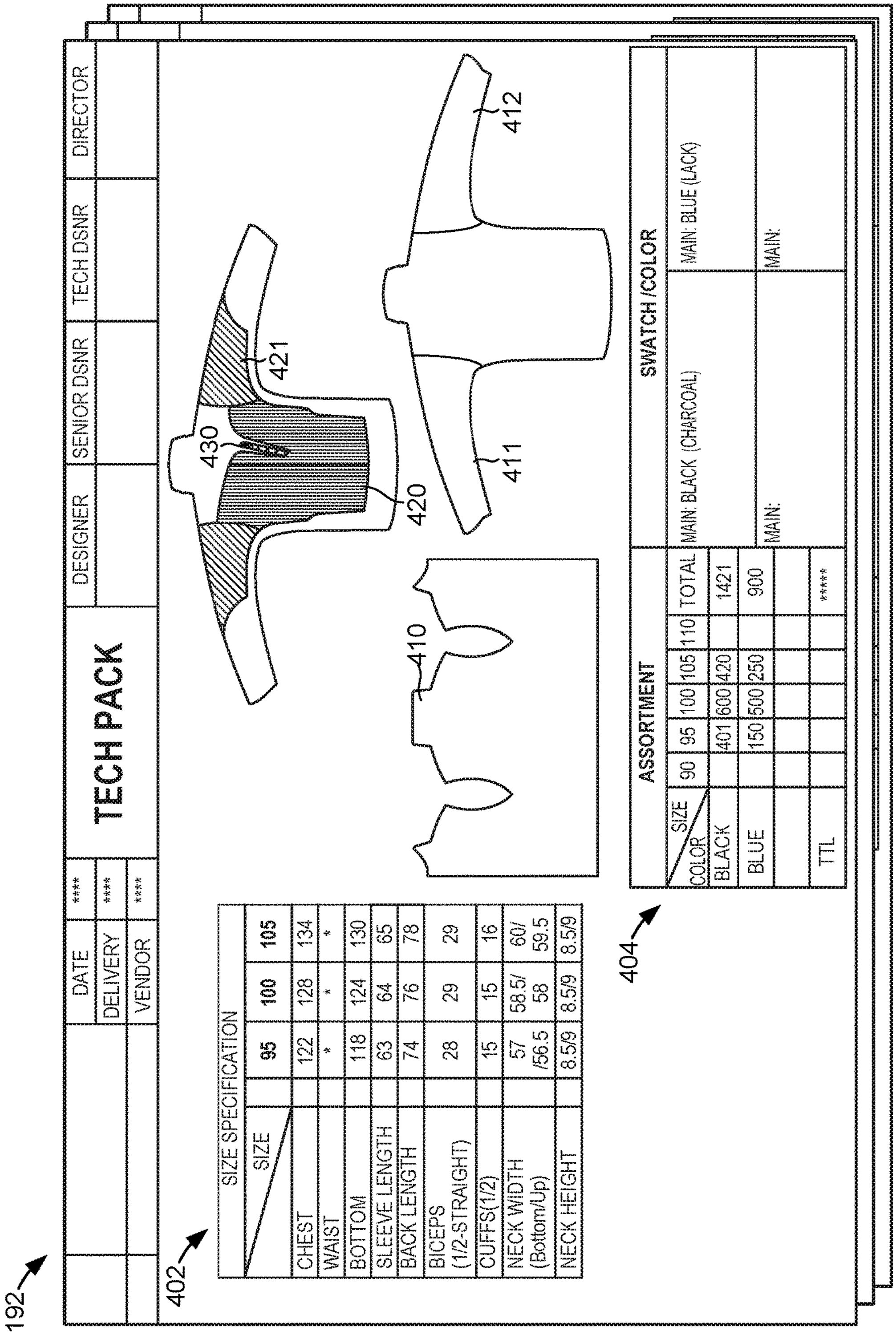
FIG. 4 illustrates example tech packs for apparel manufacturing according to various embodiments of the present disclosure.

FIG. 4 illustrates an example tech pack 192 for apparel manufacturing according to various embodiments of the present disclosure. The tech pack 192 in FIG. 4 is provided by way of example of the types of information that can be included or defined in a tech pack, but is not intended to be limiting, as the requirements for different textile and other products will vary. Further, the tech pack 192 is not necessarily representative of the format of the types of information included or defined in tech packs. In various embodiments, the tech packs 192 can be embodied as digital or electronic files, such JDF or other types of files.

As shown in FIG. 4, the tech pack 192 includes the specifications of a product, including size specifications 402, order piece/assortment specifications 404, panel size and shape specifications 410-412, fabric type/print pattern specifications 420 and 421, and fastener specifications 430. Although not shown in FIG. 4, the tech pack 192 can also include assembly specifications, such as stitch patterns, thread types and/or colors, an order of assembly operations, etc. As discussed above, the tech pack 192 can be generated at any of the client devices 160 and forwarded to the computing environment 110 over the network 150.

Figure 5A:
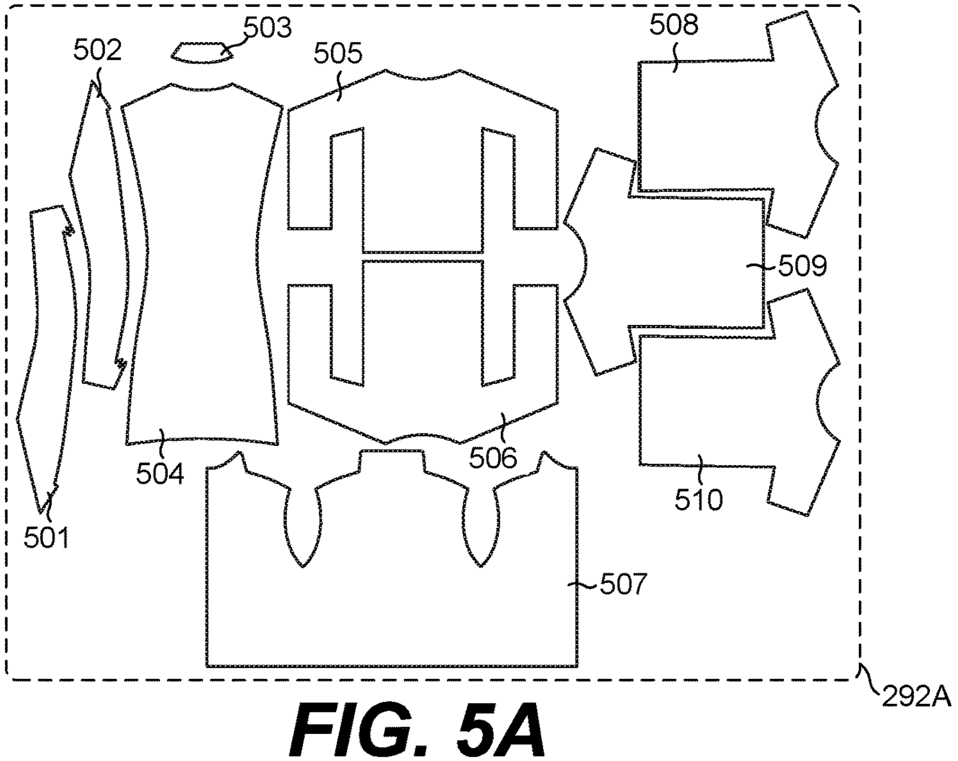
FIGS. 5A and 5B illustrate example aggregated textile panel templates according to various embodiments of the present disclosure.

FIG. 5A illustrates an example aggregated textile panel template 292A generated by the panel arranger 312 of the computing environment 110 according to various embodiments of the present disclosure. The aggregated textile panel template 292A includes an arrangement of panels 501-510. As described herein, the panels 501-510 form sections or portions of fabric or other materials for various products defined in one or more orders for products. To the extent possible, the panels 501-510 are tightly arranged, aligned, and/or oriented in the aggregated textile panel template 292A by the panel arranger 312 to conserve fabric or other material on the sheet upon which the panels 501-510 will be printed and cut out. It is noted that, because the computing environment 110 aggregates multiple orders for products, the panels 501-510 in the aggregated textile panel template 292A can be associated with more than one order for more than one customer. In that context, although they are for different orders, the panel arranger 312 can place all the panels 501-510 in the aggregated textile panel template 292A because each of them is specified for manufacture using the same type of textile sheet or other sheet of materials. Thus, in the facility 170, for example, the textile printer 210 and the textile cutter 230 can be set up for operations using that type of textile sheet, and all the panels 501-510 can be printed and cut out at the same time. In that way, the panel arranger 312 can aggregate same-type fabric panels among orders for efficiency.

Figure 5B:
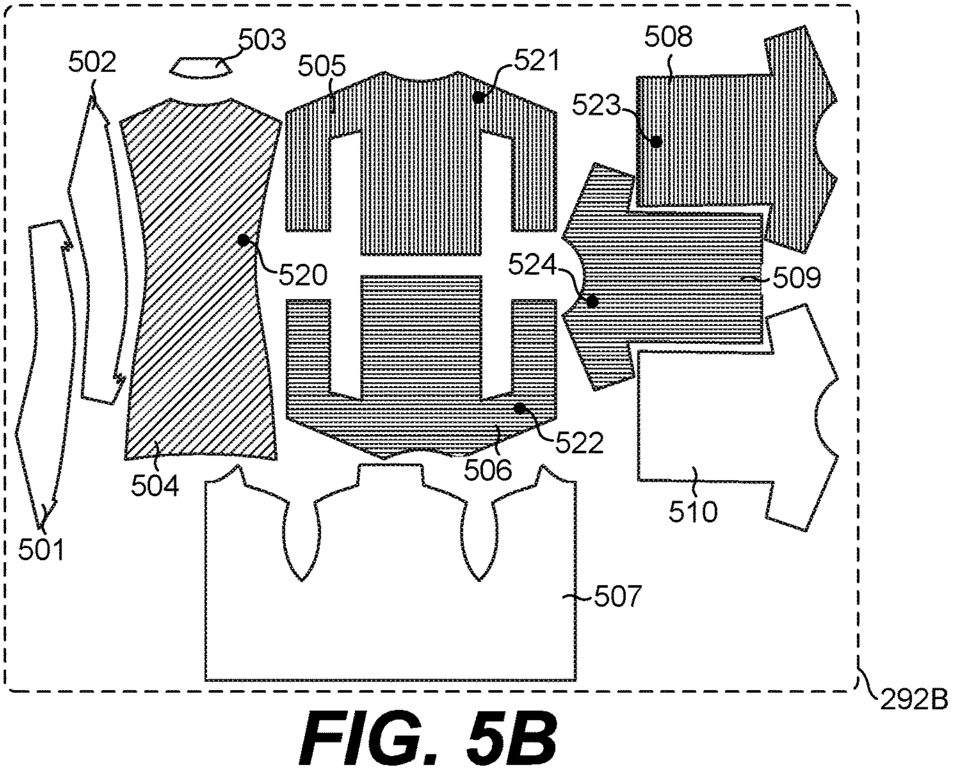

FIG. 5B illustrates an example aggregated textile panel template 292B generated by the panel arranger 312 according to various embodiments of the present disclosure. As compared to the aggregated textile panel template 292A, the aggregated textile panel template 292B further includes print patterns 520-524 of the panels 504-506, 508, and 509, respectively. The print patterns 520-524 can be printed upon the panels 504-506, 508, and 509 by the textile printer 210 (FIG. 2). It is noted that, where no print pattern is associated with a panel in the aggregated textile panel templates 292A or 292B, the aggregated textile panel template can define the shape and extents of the panel without any information for printing by the textile printer 210. In other words, although an outline of the panel 507 is illustrated in both FIGS. 5A and 5B, that outline is representative of the shape and extents of the panel 507, but does not necessarily define information for printing by the textile printer 210. Instead, that information may be used by the cut control instruction generator 322 (FIG. 3) to generate cut control instructions for the textile cutter 230 (FIG. 2).

Figure 6:
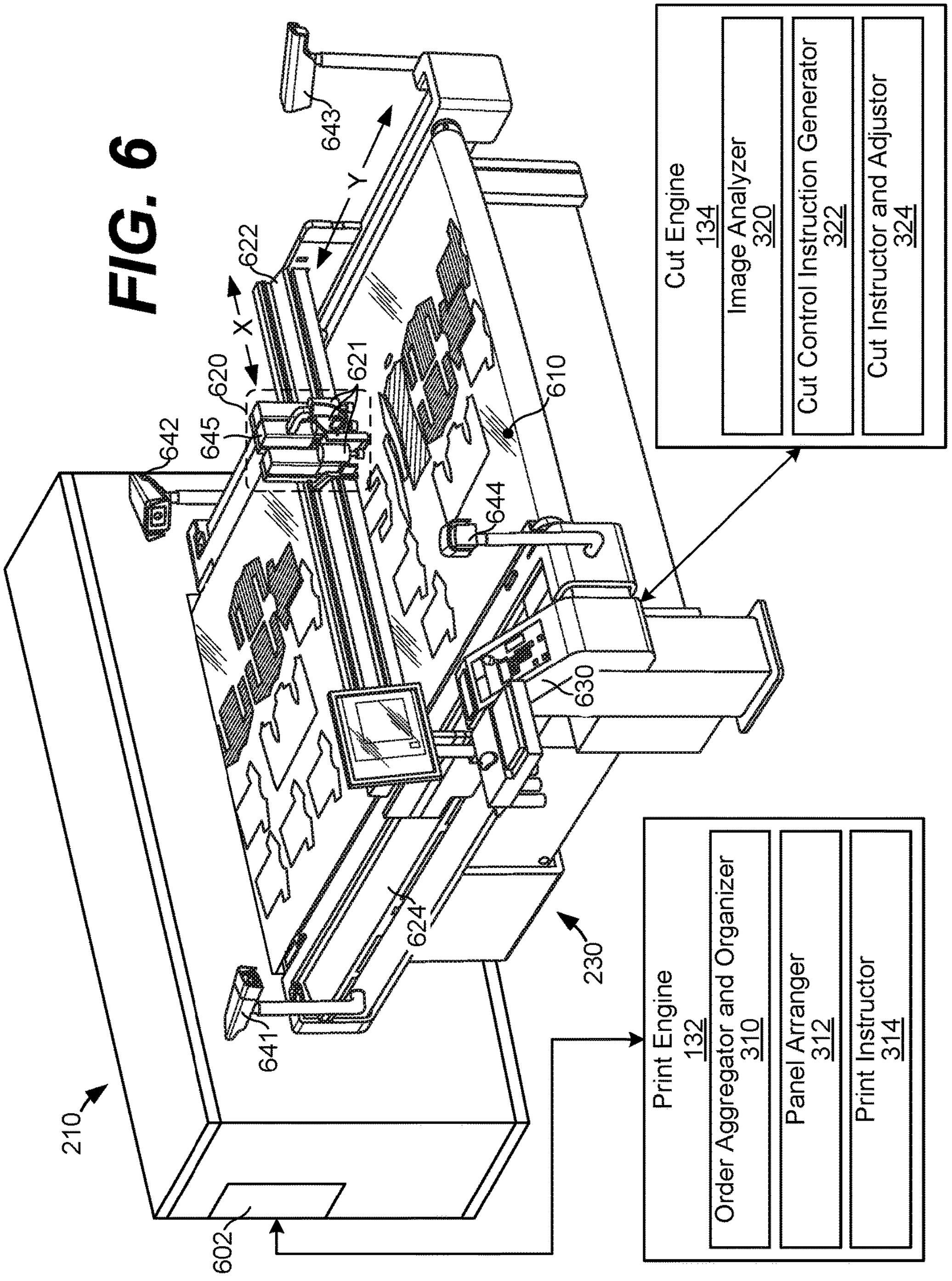
FIG. 6 illustrates an example textile printer and textile cutter according to various embodiments of the present disclosure.

FIG. 6 illustrates the textile printer 210 and the textile cutter 230 according to various embodiments of the present disclosure. In FIG. 6, the textile dryer 220 shown in FIG. 2 is omitted for simplicity. It is noted, however, that the textile dryer 220 may be placed between the textile printer 210 and the textile cutter 230 or incorporated with the textile printer 210, as needed among embodiments. The textile printer 210 includes a controller 602 that directs the operation of the textile printer 210. The controller 602 can be embodied as any suitable combination of analog, digital, or analog and digital processing circuitry, including memory, configured to control the operation of textile printer 210. Thus, the controller 602 can be embodied as a collection of vendor-specific logic, software, and/or hardware that directs the textile printer 210 to perform various printing operations. The controller 602 also includes the physical and logical interfaces for two-way control communications with the print engine 132 over the network 150, such as physical layer network interfaces, service interfaces, APIs, etc.

As described above, the textile printer 210 receives print control instructions from the print engine 132 over the network 150 (not shown in FIG. 6). For example, the print instructor 314 can forward one or more of the aggregated textile panel templates 292A and/or 292B (FIGS. 5A and 5B) to the textile printer 210 for printing. The print instructor 314 can also monitor the ongoing printing operations of the textile printer 210 to coordinate printing processes with the cutting processes being performed by the textile cutter 230.

Based on the print control instructions received from the print engine 132, the textile printer 210 prints various panels on the textile sheet 610 or sheets of other material(s). The textile printer 210 also prints print patterns on or over certain panels on the textile sheet 610. The textile sheet is then fed from the textile printer 210 to the textile cutter 230 as shown in FIG. 6. The textile cutter 230 can include adjustable vacuums, rollers, clips, hold-downs, etc., to hold and/or maneuver the textile sheet 610 as it is being fed from the textile printer 210 for cutting.

The textile cutter 230 includes a cutting head assembly 620 adjustably mounted to an articulating rail 622. The articulating rail 622 is adjustably mounted to a table 624 of the textile cutter 230. Using motors, pulleys, or another suitable mechanism, the cutting head assembly 620 can move or slide along the articulating rail 622 in the "X" direction, and the articulating rail 622 can move or slide along the table 624 in the "Y" direction. Thus, the cutting head assembly 620 is configured to traverse the table 624 to cut panels out from the textile sheet 610.

The cutting head assembly 620 includes one or more tools 621 for cutting panels out of the textile sheet 610. For example, the tools 621 can include one or more drag knives, wheel knives, laser knives, pneumatic and/or electric oscillating cutting knives and/or tools, pneumatic and/or electric rotary cutting knives and/or tools, scoring tools, v-cutting (e.g., scissor-type) tools, partout tools, creasing tools, routing and/or engraving tools, and other types of tools for cutting and/or manipulating the textile sheet 610.

The textile cutter 230 also includes cameras 641-644 placed around the table 624 and, in some embodiments, another camera 645 in the cutting head assembly 620. The camera 645 in the cutting head assembly 620 provides a close view of the tools 621 and the operations performed by the tools 621. The cameras 641-645 can include any suitable type of image sensor for capturing the details of the textile sheet 610. In one embodiment, the cameras 641-645 can include high-resolution image sensors capable of capturing thread or weave patterns in the textile sheet 610, as well as fine details printed on the textile sheet 610 by the textile printer 210. In one embodiment, the cameras 641-645 can include an image sensor capable of capturing the reflection of long wave ultraviolet ("UV") light. In that case, the cameras 641-645 may also include UV light bulbs or emitters that cast UV light upon the textile sheet 610. In that way, UV light reflected by washable, UV-reflective inks printed upon the textile sheet 610 by the textile printer 210 can be captured in images by the cameras 641-645.

Generally, the cameras 641-645 capture images of the textile sheet 610 as it is being fed out from the textile printer 210, as it is being advanced along the table 624, and as it is being cut by the cutting head assembly 620. Because of its location in the cutting head assembly 620, the camera 645 can capture close-up images of the tools 621 cutting through the textile sheet 610. Those images are fed back to the image analyzer 320 in the cut engine 134 for image processing. Using the images, the image analyzer 320 is configured to identify factors to control the cut of the textile sheet 610 by the textile cutter 230. For example, a textile thread, weave, nap, or knit pattern of the textile sheet 610, textile print pattern alignment on the textile sheet 610, or panel deformation of the textile sheet 610 on the table 624, for example, can be identified by the image analyzer 320. The image analyzer 320 can also identify certain features printed on the textile sheets by the textile printer 210, such as panel cutouts for the panels, machine-readable representations (e.g., bar codes, quick response codes, etc.) of the unique identifiers, cut alignment markers for the panels, and other features. Based on the analysis performed by the image analyzer 320, the cut control instruction generator 322 can generate cut control instructions for the textile printer 230 as described herein.

Similar to the textile printer 210, the textile cutter 230 also includes a controller 630 that directs the operation of the textile cutter 230, including the cutting head assembly 620 and the articulating rail 622, among other subsystems of the textile cutter 230. The controller 630 can be embodied as any suitable combination of analog, digital, or analog and digital processing circuitry, including memory, configured to control the operation of the textile cutter 230. Thus, the controller 630 can be embodied as a collection of vendor-specific logic, software, and/or hardware that directs the textile cutter 230 to perform various cutting operations. The controller 630 also includes the physical and logical interfaces for two-way control communications with the cut engine 134 over the network 150, such as physical layer network interfaces, service interfaces, APIs, etc.

Figure 7:
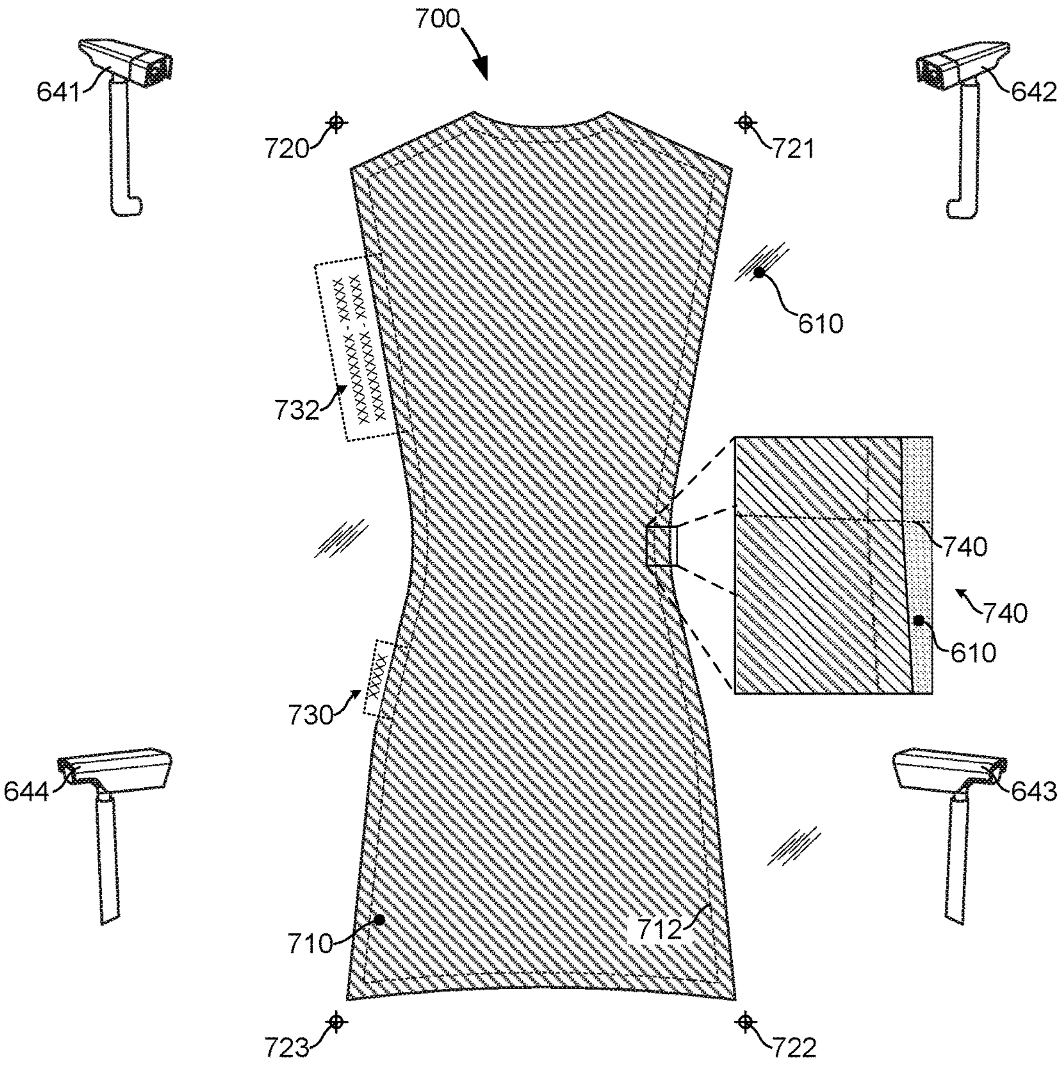
FIG. 7 illustrates an example panel for a textile product according to various embodiments of the present disclosure.

FIG. 7 illustrates an example panel 700 for a textile product according to various embodiments of the present disclosure, along with the cameras 641-644 of the textile cutter 230 (FIG. 6). The panel 700 is printed on the textile sheet 610 along with print features related to the panel 700, including a print pattern 710 printed over the panel 700, a panel cutout 712 for the panel 700, cut alignment markers 720-723 for the panel 700, a machine-readable representation 730 (e.g., bar code, quick response code, etc.) of a unique identifier for the panel 700, and assembly instructions 732 associated with the panel 700. The print features shown in FIG. 7 are not intended to be exhaustive or limiting, and the use of other types of print features is within the scope of the embodiments. Also, it is not necessary that all the print features shown in FIG. 7 are printed with the panel 700 or other panels described herein. In various embodiments, the print features shown in FIG. 7 can be added to the aggregated textile panel templates 292 generated by the print engine 132 and used by the textile printer 210 (FIG. 6).

As noted above with reference to FIG. 6, the cameras 641-644 (and 645) capture images of the textile sheet 610 as it is being advanced and cut by the textile cutter 230. Those images are fed back to the image analyzer 320 in the cut engine 134 for image processing. Using one or a combination of the images, the image analyzer 320 is configured to identify factors to control and/or adjust the cut control instructions provided to the textile cutter 230 to cut the textile sheet 610. For example, as shown in the inset 740 in FIG. 7, the image analyzer 320 can identify whether the panel 700 and/or the textile sheet 610 is being deformed as it is fed through the textile cutter 230. In that context, deformation includes bunching, stretching, asymmetrical pulling, or any other type of deformation of the textile sheet 610 or other sheet of material as it is being fed through the textile cutter 230. In the example shown in the inset 740 in FIG. 7, the image analyzer 320 can identify deformation that occurs along the crease 740 because of the shift in the orientation of the print pattern 710 and/or the threads in the textile sheet 610, for example, that occurs below the crease 740 as compared to that above the crease 740. Such changes in orientation may be an indicator of a problem on the textile cutter 230. In turn, depending upon the extent of the deformation, the cut control instruction generator 322 can either adjust the cut control instructions provided to the textile cutter 230 to account for the deformation, or the cut engine 134 can signal for assistance by an attendant or flag the panel 700 as a misprint to be discarded.

As another example, the image analyzer 320 can identify a misalignment in the orientation of the print pattern 710 upon the threads in the textile sheet 610. In other words, where an order for a textile product specifies a particular alignment between the print of the print pattern 710 over a thread, weave, nap, or knit pattern in the textile sheet 610, the image analyzer 320 can identify whether that alignment has been achieved during printing. If not, the cut engine 134 can flag the panel 700 as a misprint to be discarded. As still another example, the image analyzer 320 can identify errors in the consistency and/or orientation of the print pattern 710 and flag the panel 700 as a misprint, as necessary to maintain quality control standards.

In other aspects of the embodiments, using one or a combination of the images captured by the cameras 641-645, the image analyzer 320 is configured to correlate features of the panel 700 with the expected features of the panel 700, based on the aggregated textile panel template used to print the panel 700. For example, the image analyzer 320 can correlate or compare the actual edges of the print pattern 710 on the textile sheet 610 with the expected locations of those edges defined in the aggregated textile panel template used by the textile printer 210 (FIG. 6) to print the panel 700. Depending upon any differences, the image analyzer 320 can provide feedback to the cut control instruction generator 322 to adjust the cut control instructions provided to the textile cutter 230.

However, in other embodiments, the cut control instruction generator 322 can generate cut control instructions for the textile cutter 230 without reference to the aggregated textile panel template used to print the panel 700. For example, the image analyzer 320 can identify the panel cutout 712 and/or the cut alignment markers 720-723 for the panel 700 and use those features to generate relative and/or absolute position information to cut the textile sheet 610. In turn, the cut control instruction generator 332 can use that relative and/or absolute position information to generate cut control instructions for the textile cutter 230.

The machine-readable representation 730 of the unique identifier and the assembly instructions 732 for the panel 700 can be cut out by the textile cutter 230 along with the panel 700, or they can be cut away from the panel 700. The machine-readable representation 730 of the unique identifier for the panel 700 can be identified by the image analyzer 320 or other scanners on the textile production line 240, for example, to distinguish the panel 700 from other panels in the panel database 126 of the computing environment 110. The assembly instructions 732 can include any information related to the panel 700, such as instructions that may be relied upon by attendants on the textile production line 240, information related to the print date of the panel 700, an order or project number associated with the panel 700, a human-readable version of the unique identifier for the panel 700, a revision number associated with the panel 700, or other relevant information.

Figure 8:
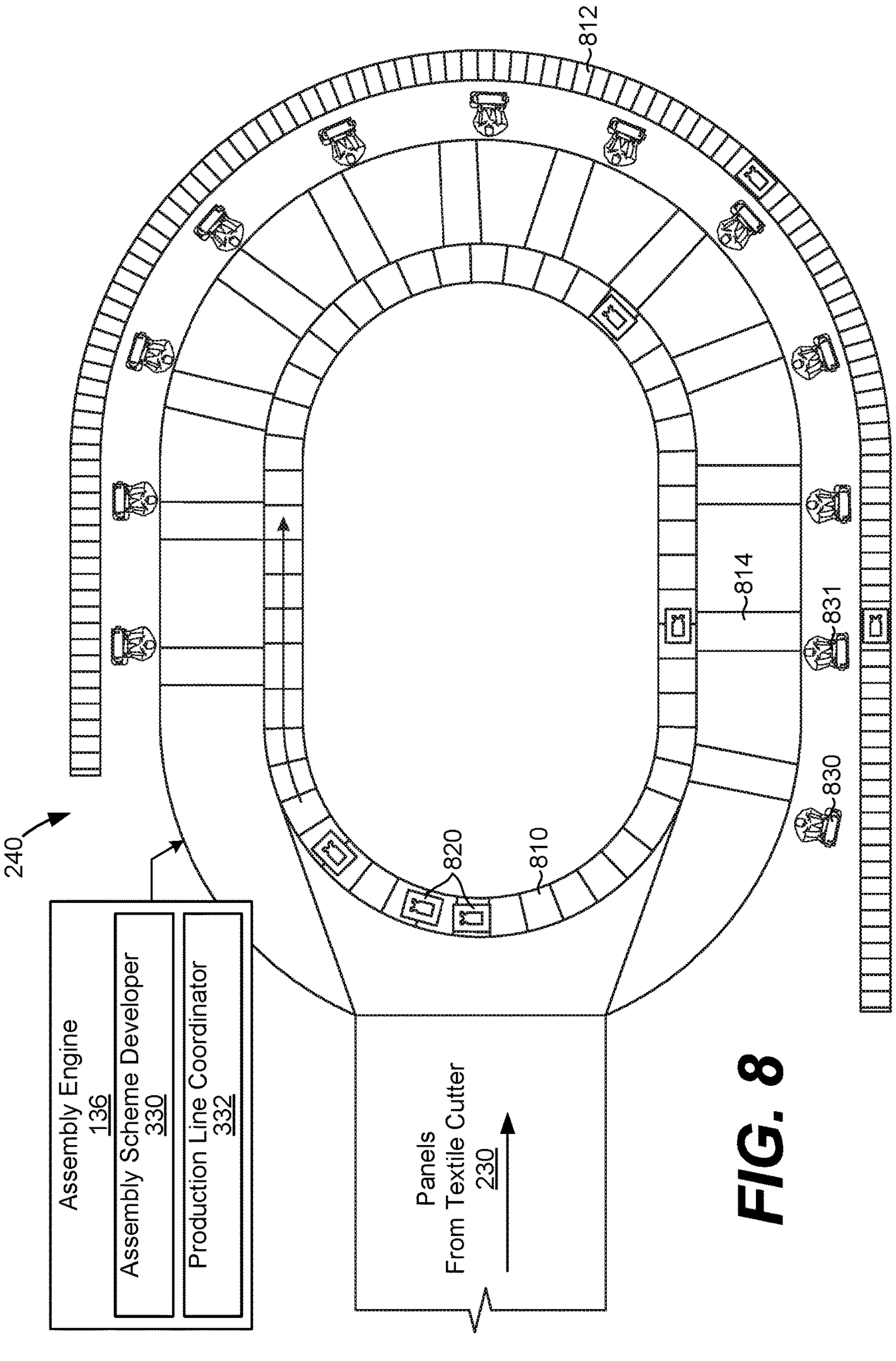
FIG. 8 illustrates an example textile production line shown in FIG. 2 for on demand apparel manufacturing according to various embodiments of the present disclosure.

FIG. 8 illustrates the example textile production line 240 shown in FIG. 2 for on demand apparel manufacturing according to various embodiments of the present disclosure. The textile production line 240 includes an inner conveyor 810, an outer conveyor 812, bilateral conveyors 814 between the inner conveyor 810 and the outer conveyor 812, totes 820 that can be directed along the inner conveyor 810, the outer conveyor 812, and the bilateral conveyors 814, and sewing or assembly stations 830 and 831, among other stations. It is noted that the textile production line 240 in FIG. 8 is provided as a representative example of a production line for the assembly of textile products. Other production lines can include alternative arrangements of conveyors and sewing or assembly stations. In other embodiments, the totes 820 can be moved among the sewing or assembly stations 830 and 831 (and others) using robots or other vehicles. In still other embodiments, the totes 820 can be moved manually.

As described above, the assembly engine 136 of the computing environment 110 is configured to direct the operations of the textile production line 240. Particularly, the assembly engine 136 is configured to direct the placement of panels from the textile cutter 230 into one or more of the totes 820 and to direct the totes 820 to one or more assembly stations, such as the assembly station 830, for example. In that context, the assembly scheme developer 330 of the assembly engine 136 is configured to generate an assembly scheme including an ordered set of instructions for the assembly of textile products with reference to the tech packs 192 and any other relevant information.

As part of the assembly scheme, one or more panels cut by the textile cutter 230 can be assigned for placement into one or more of the totes 820. Particularly, depending upon the type of the orders being processed, the assembly scheme developer 330 is configured to generate instructions for placing panels from the textile cutter 230 into the totes 820. In one embodiment, panels may be transferred from the textile cutter 230 into the totes 820 using gravity chutes, intermediary conveyors, or other mechanisms. In other embodiments, such as that shown in FIG. 9, the panels may be placed into the totes 820 using a transfer arm.

The assembly scheme developer 330 is further configured to generate instructions for directing panels in the totes 820 to various stations for sewing and/or assembly. In that context, the assembly scheme developer 330 can generate instructions for directing the totes 820 along the inner conveyor 810, the outer conveyor 812, and the bilateral conveyors 814. As an example, if one item, such as a dress, is being manufactured for an order, the assembly scheme developer 330 can generate an assembly scheme including instructions to place all panels for the dress into one of the totes 820 and to direct the tote 820 to the sewing station 830 for assembly. Alternatively, if several jackets are being manufactured, the assembly scheme developer 330 can generate an assembly scheme including instructions to place several panel-pairs (i.e., panels that are to be directly sewn together) into a tote 820 and direct the tote 820 along the inner conveyor 810, the outer conveyor 812, and the bilateral conveyors 814 to the sewing station 830 for assembly. At the sewing station 830, an attended and/or automated sewing machine can assemble each of the panel-pairs, and the assembly scheme developer 330 can generate further instructions to direct the assembled panel-pairs to the sewing station 831 for additional steps, e.g., other panels or components, in the assembly of the jackets. This process can continue, as needed, until the jackets are fully assembled.

Referring to the assembly schemes generated by the assembly scheme developer 330, the production line coordinator 332 is configured to forward the instructions to the textile production line 240 and monitor the overall operations of the textile production line 240 during assembly processes. The production line coordinator 332 can monitor the overall operations of the textile production line 240 using cameras or scanners to read codes on the totes 820, radio-frequency identifier (RFID) tags on the totes 820, electrically-actuated interlocks, and/or feedback from attendants at sewing stations, among other monitoring and feedback mechanisms.

Similarly, the assembly engine 136 is configured to compile and forward assembly instructions to the sewing or assembly stations 830 and 831, among others, for presentation of the assembly instructions on a monitor visible by an attendant, for example. In addition to instructions on how to sew or assemble individual panels together, the assembly instructions can specify the use and placement of certain fasteners, such as zippers, hooks, snaps, buttons, buckles, rivets, etc., in various products.

The assembly schemes and associated instructions generated by the assembly scheme developer 330 can be communicated to the textile production line 240 as part of two-way control communications between the assembly engine 136 and the textile production line 240 over the network 150 (FIG. 2). To coordinate its operations, the textile production line 240 can include a controller that directs the operation of the textile production line 240. The controller can be embodied as any suitable combination of analog, digital, or analog and digital processing circuitry, including memory, configured to control the operation of the inner conveyor 810, the outer conveyor 812, and the bilateral conveyors 814, among other subsystems. Thus, the controller can be embodied as a collection of vendor-specific logic, software, and/or hardware that directs the textile production line 240. The controller can also include the physical and logical interfaces for two-way control communications with the assembly engine 136 over the network 150, such as physical layer network interfaces, service interfaces, APIs, etc.

As described above, once various textile products are assembled on the textile production line 240, they can be routed to QC stations, photographed for placement in an electronic commerce system, shipped to customers, and/or stored for order fulfillment.

Figure 9:
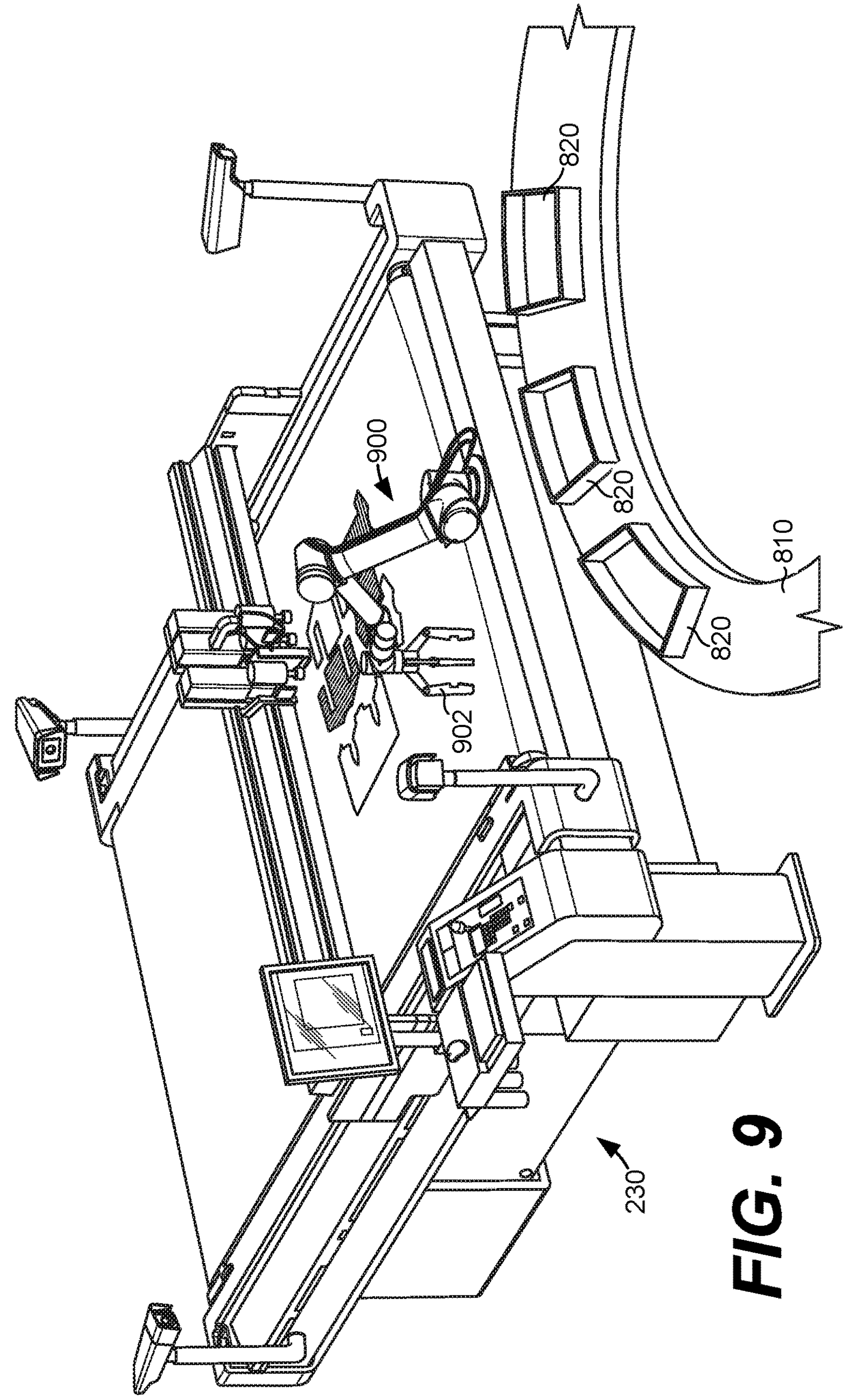
FIG. 9 illustrates an example transfer arm for on demand apparel manufacturing according to various embodiments of the present disclosure.

FIG. 9 illustrates an example transfer arm 900 for on demand apparel manufacturing according to various embodiments of the present disclosure. As shown, the transfer arm 900 is equipped with an end of arm tool 902, e.g., a mechanical gripper, at the end of the textile cutter 230. The inner conveyor 810 and totes 820 of the textile production line 240 are also illustrated in FIG. 9. In this embodiment, once panels are cut out by the textile cutter 230, the assembly engine 136 can direct the transfer arm 900 to place the panels into one or more of the totes 820 based on the assembly scheme and associated instructions generated by the assembly scheme developer 330. Once placed into the totes 820, the panels can be directed along textile production line 240 for the assembly of textile products as described herein.

Figure 10A:
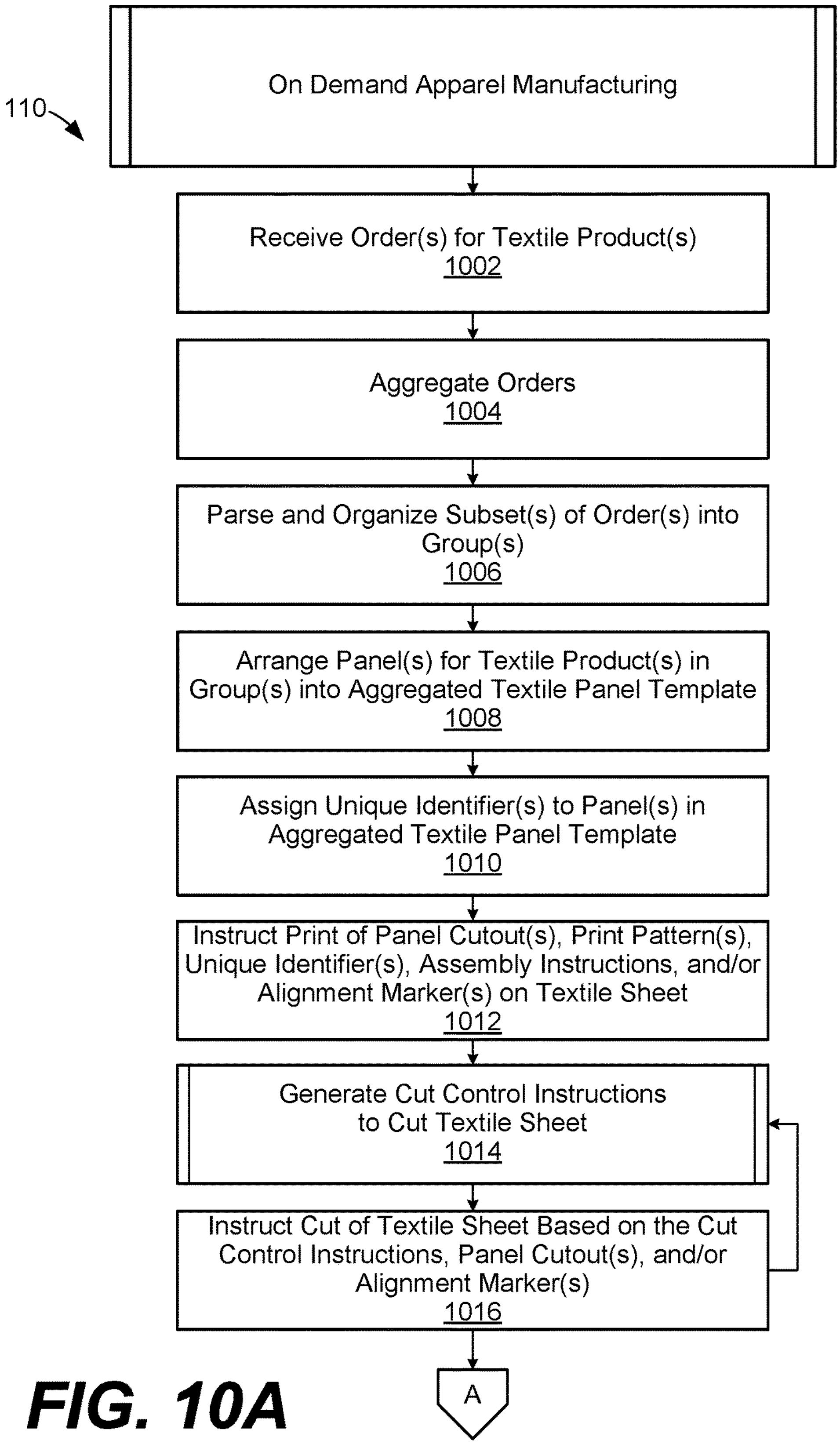
FIG. 10A illustrates an example process for on demand apparel manufacturing according to various embodiments of the present disclosure.
Figure 10B:
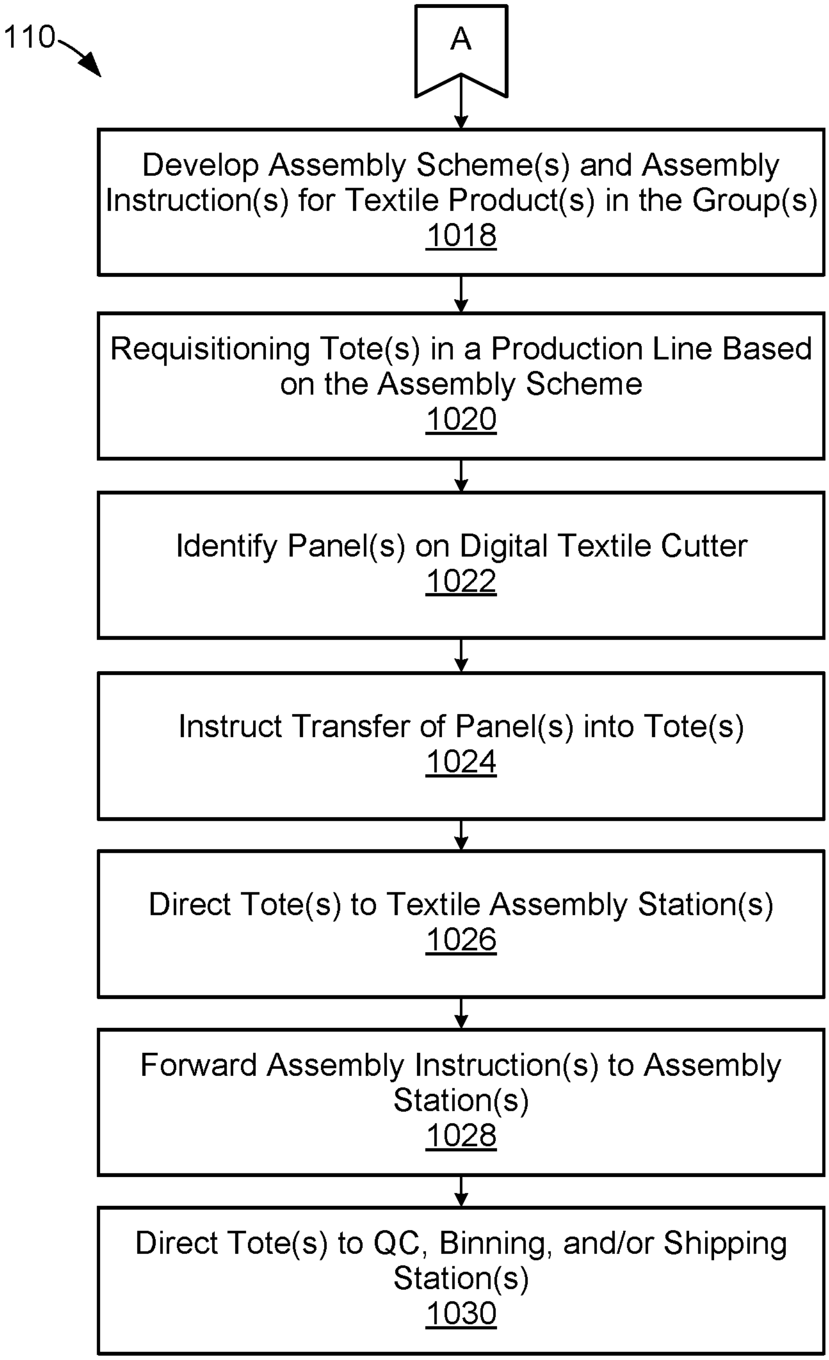
FIG. 10B further illustrates the example process for on demand apparel manufacturing in FIG. 10A according to various embodiments of the present disclosure.

Turning to FIGS. 10A and 10B, a process of on demand apparel manufacturing is illustrated. The process can be performed in the networked environment 100 in FIG. 1 according to various embodiments of the present disclosure. In certain aspects, the flowchart shown in FIGS. 10A and 10B may be viewed as depicting an example group of steps performed in the networked environment 100 according to one or more embodiments. It should be appreciated that the flowchart shown in FIGS. 10A and 10B provides merely one example of a functional sequence or arrangement that may be employed to implement the operations of the networked environment 100 described herein. It is noted here that, although the process is described in connection with the computing environment 110 shown in FIGS. 1-3, other computing environments may perform the process illustrated in FIGS. 10A and 10B.

At reference numeral 1002, the process includes the computing environment 110 receiving orders for textile or other products. The orders can be received from the client devices 160 over the network 150 and stored in the apparel manufacturing data store 120. As described herein, the orders may be defined, at least in part, by one or more tech packs 192 received from the client devices 160. At reference numeral 1004, the process includes the computing environment 110 aggregating the orders for textile products and/or products including other materials over time. As described herein, by aggregating orders from various geographic locations and coordinating apparel assembly processes on a relatively large scale, increased efficiency in apparel manufacturing can be achieved.

At reference numeral 1006, the process includes the print engine 132 parsing and organizing one or more subsets of the orders into a group of orders according to a productivity factor. For example, the order aggregator and organizer 310 of the print engine 132 can organize orders received from the client devices 160 into one or more groups of orders (e.g., the groups of orders 290 and 291 in FIG. 2) based on one or more productivity or efficiency factors, such as size, shape, fabric type, delivery location, etc. of the textile products defined by the orders, with reference to the tech packs 192 that define the specifications of the orders.

At reference numeral 1008, the process includes the print engine 132 arranging panels for textile products in the group of orders into an aggregated textile panel template. For example, the panel arranger 312 of the print engine 132 can arrange panels for textile products contained in a group of orders (e.g., one of the groups of orders 290 or 291 in FIG. 2) into one or more aggregated textile panel templates, such as the aggregated textile panel templates 292 shown in FIG. 2. The panels in an aggregated textile panel template can be representative of one or more sections or portions of fabric or other materials for one or more shirts, pants, dresses, or other accessories or items to be manufactured. In one embodiment, when arranging panels, the panel arranger 312 is configured to align the panels to the extent possible among each other to reduce scrap in textile sheets as described herein. Additionally or alternatively, the panel arranger 312 can orient panels in the aggregated textile panel templates to align them with a thread, weave, nap, knit, or print pattern(s) in textile sheets. In other aspects of the embodiments, the panel arranger 312 can incorporate other features into the aggregated textile panel templates, such as panel cutouts, panel identifiers, cut alignment markers, assembly instructions, and other features.

At reference numeral 1010, the process includes the print engine 132 assigning a unique identifier for the panels in the aggregated textile panel templates generated at reference numeral 1008. For example, the panel arranger 312 of the print engine 132 can assign unique identifiers for each panel in the aggregated textile panel templates and store those identifiers in the panel database 126 for reference by the computing environment 110.

At reference numeral 1012, the process includes the print engine 132 instructing the textile printer 210 to print panels for textile products in a group of orders on a textile sheet based in part on the aggregated textile panel template(s) associated with group of orders. For example, the print instructor 314 of the print engine 132 can instruct the textile printer 210 to print panels for textile products, along with print features related to the panels, such as print patterns, panel cutouts, cut alignment markers, machine-readable representations of unique identifiers for the panels, and assembly instructions. At reference numeral 1012, the print instructor 314 can also coordinate the printing operations of the textile printer 210 over the network 150. In that context, the print instructor 314 can forward one or more aggregated textile panel templates to the textile printer 210 over the network 150 and monitor the ongoing printing operations of the textile printer 210 in printing the aggregated textile panel templates.

At reference numeral 1014, the process includes the cut engine 134 generating cut control instructions for the textile cutter 230 to cut out the panels printed at reference numeral 1012. Further, at reference numeral 1016, the process includes the cut engine 134 instructing the textile cutter 230 to cut the plurality of panels out from the textile sheet. The generation of cut control instructions and control of the textile cutter 230 is described in further detail below with reference to FIG. 11.

Turning to FIG. 10B, at reference numeral 1018, the process includes the assembly engine 136 developing an assembly scheme for the assembly of the textile products in the group of orders. For example, the assembly scheme developer 330 of the assembly engine 136 can generate an assembly scheme including an ordered set of instructions for the assembly of the textile products in the group of orders. As described herein, depending upon the type of the orders being processed, the assembly scheme developer 330 can generate instructions for placing the panels into totes of the textile production line 240.

At reference numeral 1020, the process includes the assembly engine 136 requisitioning one or more totes in the textile production line 240 based in part on the assembly scheme developed at reference numeral 1018. For example, depending upon the type of the orders being processed, the assembly scheme developer 330 may need to requisition one tote or several totes in the textile production line 240 to transfer one or more panels to various sewing or assembly stations. Thus, at reference numeral 1020, the assembly engine 136 identifies a number of totes needed for the assembly scheme and determines which totes in the textile production line 240 are available.

At reference numeral 1022, the process includes the cut engine 134 identifying one or more panels that have been cut out from the textile sheet and are now ready for assembly in a textile product according to the assembly scheme developed at reference numeral 1018. The image analyzer 320 of the cut engine 134 can identify one or more panels that have been cut out from among various panels on the textile sheet based in part on machine-readable representations of unique identifiers for the panels, for example, or other identifying factors described herein.

At reference numeral 1024, the process includes the assembly engine 136 instructing a transfer of the panels identified at reference numeral 1022 into one or more of the totes requisitioned at reference numeral 1020. The panels may be transferred from the textile cutter 230 into the totes of the textile production line 240 using gravity chutes, intermediary conveyors, a transfer arm, or other mechanisms by the direction of the production line coordinator 332 of the assembly engine 136.

At reference numeral 1026, the process includes the assembly engine 136 directing the one or more totes to a textile assembly station of the textile production line 240 based on the assembly scheme developed at reference numeral 1018. For example, if one item, such as a dress, is being assembled for an order, the assembly engine 136 can generate instructions to place all panels for the dress into one tote and direct the tote along a conveyor system of the production line 240 to a single sewing station for assembly. Alternatively, if several jackets are being assembled, the assembly engine 136 can generate instructions to place several panel-pairs (i.e., panels that are to be directly sewn together) into a tote and direct the tote along the conveyor system to a single sewing station for assembly. At the sewing station, an attendant and/or automated sewing machine can assemble each of the panel-pairs, and the assembly engine 136 can generate further instructions to direct the assembled panel-pairs to another sewing station along the conveyor system for additional steps in the assembly of the jackets.

At reference numeral 1028, the process includes the assembly engine 136 forwarding assembly instructions to one or more sewing or assembly stations in the textile production line 240 based on the assembly scheme and assembly instructions generated at reference numeral 1018. For example, the assembly engine 136 can forward assembly instructions to one or more sewing or assembly stations, for presentation on a monitor visible by an attendant, for example. Using the panels and assembly instructions, one or more textile products can be assembled at the assembly stations.

At reference numeral 1030, the process includes the assembly engine 136 directing one or more totes including finished, assembled textile products to one or more QC, photography, binning, and/or packing stations. Thus, the assembled textile products can be checked for quality control, photographed for placement in an electronic commerce system, stored in a materials handling area/facility, packaged for shipping, etc.

Figure 11:
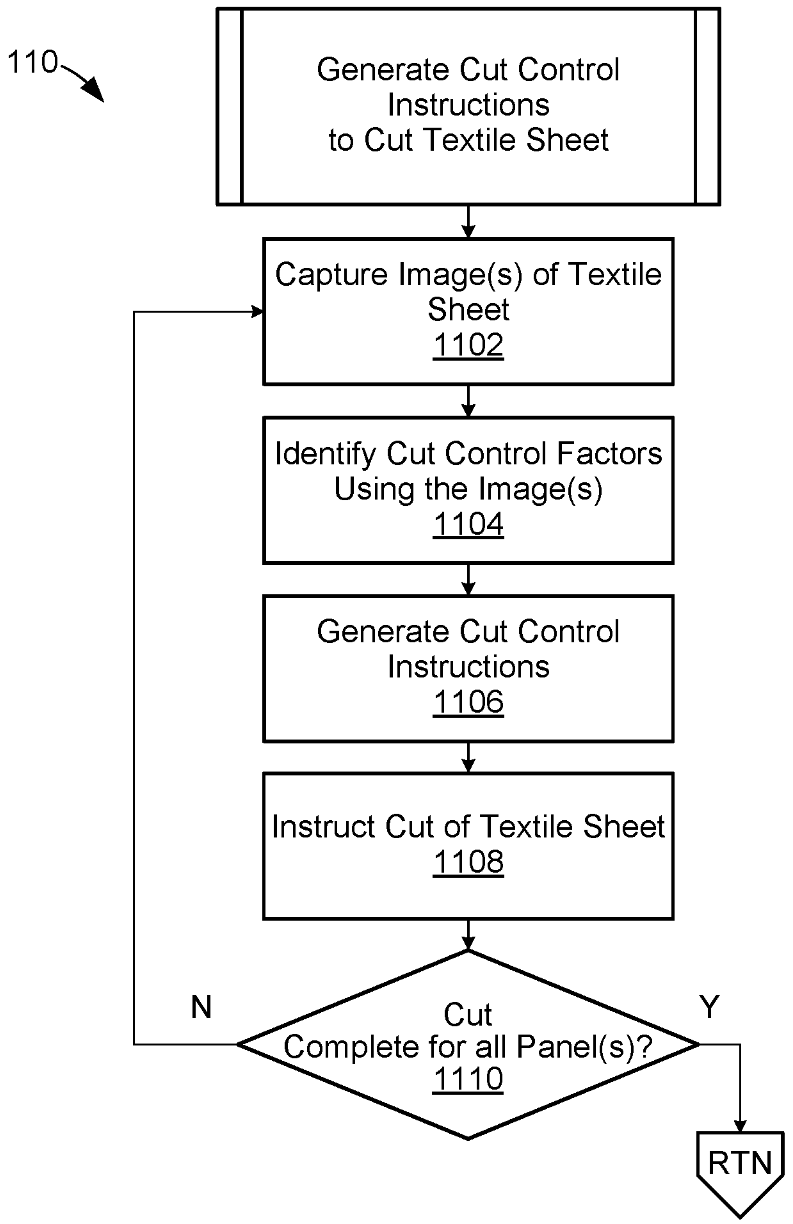
FIG. 11 illustrates an example process for the generation of cut control instructions according to various embodiments of the present disclosure.

FIG. 11 illustrates an example process for the generation of cut control instructions according to various embodiments of the present disclosure. The process illustrated in FIG. 11 takes the place of those at reference numerals 1014 and 1016 in FIG. 10A. At reference numeral 1102, the process includes the cut engine 134 capturing one or more images of a textile sheet on the textile cutter 230. For example, the image analyzer 320 can direct the cameras 641-645 of the textile cutter 230 to capture images of the textile sheet as it is being fed out from the textile printer 210, as it is being advanced through the textile cutter 230, and as it is being cut by the textile cutter 230.

At reference numeral 1104, the process includes the cut engine 134 identifying cut control factors using the images of the textile sheet. As described herein, the cut control factors can identify a textile weave of the textile sheet, a textile weave print pattern alignment on the textile sheet, a panel deformation of the textile sheet on the textile cutter 230, or other factors.

At reference numeral 1106, the process includes the cut engine 134 generating cut control instructions to cut panels out from the textile sheet using the textile cutter 230 based on the cut control factors identified at reference numeral 1104 and/or the aggregated textile panel template used to print the panels. The cut control instructions can be generated in the form of a CAM or similar file format for processing by the textile cutter 230. In the generation of cut control instructions, the cut control instruction generator 322 can refer to various types of information. For example, the cut control instruction generator 322 can refer to the analysis performed by the image analyzer 320, the aggregated textile panel templates used to print panels, the specifications of the textile sheets (e.g., the type, thickness, grade, weave pattern, thread count, etc.) being cut, and other factors.

At reference numeral 1108, the process includes the cut instructor and adjustor 324 instructing the textile cutter 230 to cut the textile sheet. That is, the cut instructor and adjustor 324 forwards the cut control instructions generated at reference numeral 1106 to the textile cuter 230 over the network 150. The cut instructor and adjustor 324 also adapts the cut control instructions, over time and during cutting operations, based on the image capture and analysis performed at reference numerals 1102 and 1104. In that context, at reference numeral 1110, the process determines whether the cut operations are complete for all panels. If not, the process proceeds back to reference numeral 1102 to capture images of the textile sheet on the textile cutter 230 in an ongoing fashion during cutting, as described herein. By capturing images of textile sheets after panels and/or print patterns have been printed on them and adjusting the cut control instructions provided to the textile cutter 230 over time, the cut instructor and adjustor 324 can dynamically adjust the cutting operations performed by the textile cutter 230. If all cut operations are complete, the process return back to reference numeral 1018 in FIG. 10B.

Figure 12:
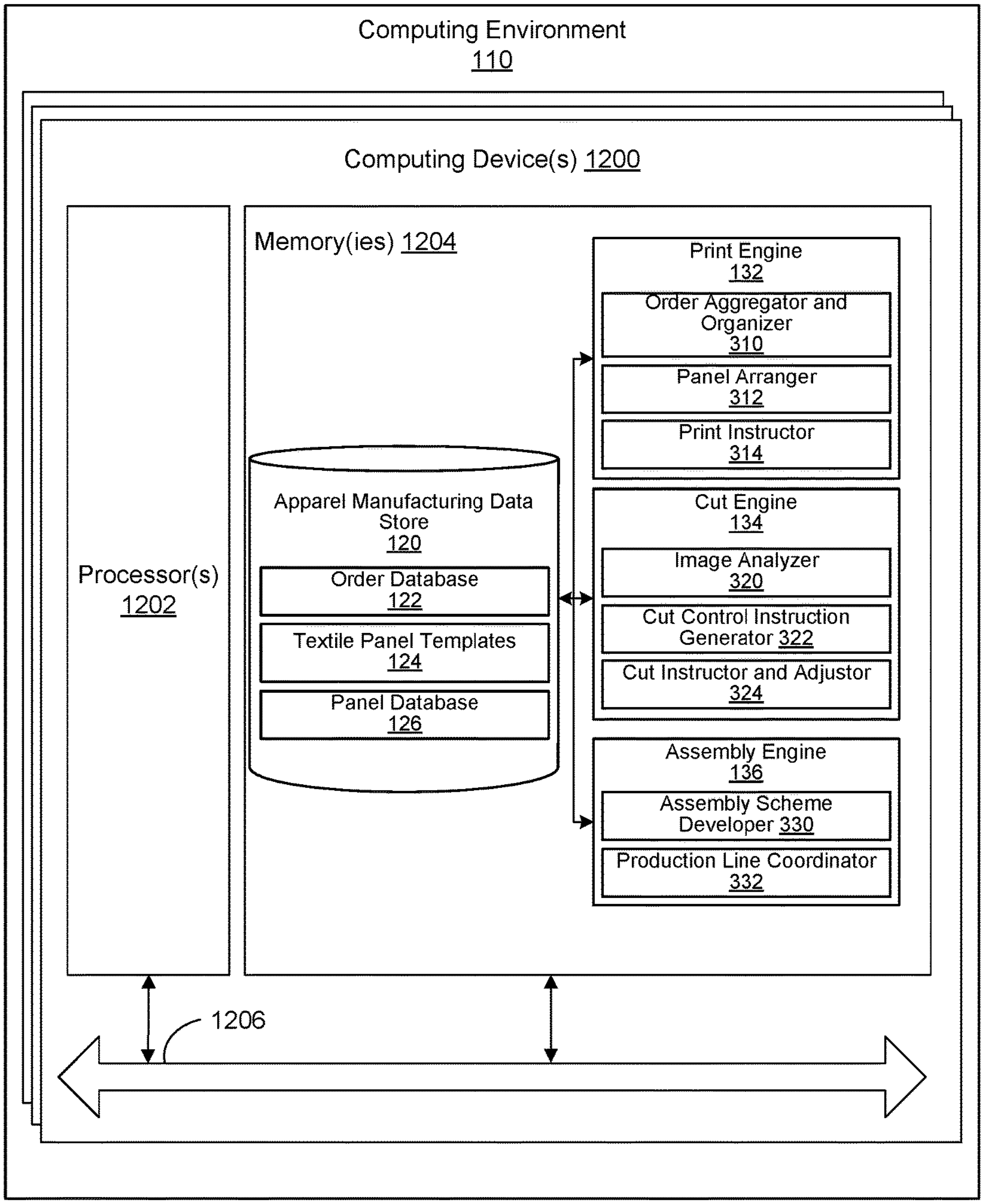
FIG. 12 illustrates an example schematic block diagram of the computing environment employed in the networked environment shown in FIG. 1 according to various embodiments of the present disclosure.

FIG. 12 illustrates an example schematic block diagram of the computing environment 110 employed in the networked environment 100 in FIGS. 1-3 according to various embodiments of the present disclosure. The computing environment 110 includes one or more computing devices 1200. Each computing device 1200 includes at least one processing system, for example, having a processor 1202 and a memory 1204, both of which are electrically and communicatively coupled to a local interface 1206. To this end, each computing device 1200 may be embodied as, for example, at least one server computer or similar device. The local interface 1206 may be embodied as, for example, a data bus with an accompanying address/control bus or other bus structure as can be appreciated.

In various embodiments, the memory 1204 stores data and software or executable-code components executable by the processor 1202. For example, the memory 1204 may store executable-code components associated with the print engine 132, cut engine 134 and assembly engine 136 for execution by the processor 1202. The memory 1204 may also store data such as that stored in the apparel manufacturing data store 120, among other data.

It should be understood and appreciated that the memory 1204 may store other executable-code components for execution by the processor 1202. For example, an operating system may be stored in the memory 1204 for execution by the processor 1202. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

As discussed above, in various embodiments, the memory 1204 stores software for execution by the processor 1202. In this respect, the terms "executable" or "for execution" refer to software forms that can ultimately be run or executed by the processor 1202, whether in source, object, machine, or other form. Examples of executable programs include, for example, a compiled program that can be translated into a machine code format and loaded into a random access portion of the memory 1204 and executed by the processor 1202, source code that can be expressed in an object code format and loaded into a random access portion of the memory 1204 and executed by the processor 1202, or source code that can be interpreted by another executable program to generate instructions in a random access portion of the memory 1204 and executed by the processor 1202, etc. An executable program may be stored in any portion or component of the memory 1204 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 1204 may include both volatile and nonvolatile memory and data storage components. Volatile components are those that do not retain data values upon loss of power. Nonvolatile components are those that retain data upon a loss of power. Thus, the memory 1204 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 1202 may represent multiple processors 1202 and/or multiple processor cores and the memory 1204 may represent multiple memories that operate in parallel, respectively, or in combination. Thus, the local interface 1206 may be an appropriate network or bus that facilitates communication between any two of the multiple processors 1202, between any processor 1202 and any of the memories 1204, or between any two of the memories 1204, etc. The local interface 1206 may include additional systems designed to coordinate this communication, including, for example, a load balancer that performs load balancing. The processor 1202 may be of electrical or of some other available construction.

As discussed above, the print engine 132, the cut engine 134, and the assembly engine 136 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 10A, 10B, and 11 are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 1202. The machine code may be converted from the source code, etc. Further, each block may represent, or be connected with, a circuit or a number of interconnected circuits to implement a certain logical function or process step.

Although the flowcharts or process diagrams of FIGS. 10A, 10B, and 11 illustrate a specific order, it is understood that the order may differ from that which is depicted. For example, an order of execution of two or more blocks may be scrambled relative to the order shown. Also, two or more blocks shown in succession in FIGS. 10A, 10B, and 11 may be executed concurrently or with partial concurrence. Further, in some embodiments, one or more of the blocks shown in FIGS. 10A, 10B, and 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the print engine 132, the cut engine 134, and the assembly engine 136 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIGS. 10A, 10B, and 11. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program that, when executed by at least one computing device, directs the at least one computing device to perform a method comprising:

aggregating, by at least one computing device, a plurality of orders for textile products;

arranging, by the at least one computing device, a plurality of panels for textile products in the plurality of orders into an aggregated textile panel template;

instructing, by the at least one computing device, a textile printer to print a panel cutout for a panel among the plurality of panels in the aggregated textile panel template on a textile sheet; and instructing, by the at least one computing device, the textile printer to print a print pattern of the panel over the panel cutout on the textile sheet;

instructing, by the at least one computing device, the textile printer to print a machine-readable alignment marker on the textile sheet for the panel cutout;

capturing, by the at least one computing device, an image of the textile sheet including the print pattern, the panel cutout, and the machine-readable alignment marker;

identifying, by the at least one computing device, a shift in orientation of the print pattern on the textile sheet with reference to the image of the textile sheet;

generating, by the at least one computing device, cut control instructions to cut the textile sheet based in part on the image, the shift in orientation of the print pattern on the textile sheet, and the aggregated textile panel template; and instructing, by the at least one computing device, a textile cutter to cut the panel out from the textile sheet based in part on at least one of the cut control instructions, the panel cutout, or the machine-readable alignment marker.

2. The non-transitory computer-readable medium of claim 1, wherein the method further comprises:

assigning, by the at least one computing device, a unique identifier for the panel in the aggregated textile panel template; and instructing, by the at least one computing device, the textile printer to print a machine-readable representation of the unique identifier for the panel on the textile sheet.

3. The non-transitory computer-readable medium of claim 1, wherein capturing an image of the textile sheet comprises capturing a plurality of images of the textile sheet from multiple angles, at least a portion of the plurality of images including the panel cutout, the print pattern, and the machine-readable alignment marker.

4. A method, comprising:

arranging, by at least one computing device, a plurality of panels for textile products into an aggregated textile panel template;

instructing, by the at least one computing device, a textile printer to print a print pattern of a panel among the plurality of panels in the aggregated textile panel template over an area for the panel on a textile sheet;

capturing, by the at least one computing device, an image of the textile sheet including the print pattern;

identifying, by the at least one computing device, a shift in orientation of the print pattern on the textile sheet with reference to the image of the textile sheet;

generating, by the at least one computing device, cut control instructions to cut the textile sheet based in part on the image, the shift in orientation of the print pattern on the textile sheet, and the aggregated textile panel template; and instructing, by the at least one computing device, a textile cutter to cut the panel out from the textile sheet based in part on the cut control instructions.

5. The method of claim 4, further comprising identifying, by the at least one computing device, a panel deformation of the textile sheet on the textile cutter.

6. The method of claim 4, wherein capturing the image of the textile sheet comprises capturing, by the at least one computing device, a plurality of images of the textile sheet taken from multiple angles.

7. The method of claim 6, further comprising:

triangulating, by the at least one computing device, a cutting path to cut the panel out from the textile sheet based in part on the plurality of images of the textile sheet taken from multiple angles, wherein generating the cut control instructions comprises generating, by the at least one computing device, the cut control instructions to cut the panel out from the textile sheet based further in part on the cutting path.

8. The method of claim 4, further comprising:

instructing, by the at least one computing device, the textile printer to print a panel cutout for the panel on the textile sheet, wherein generating the cut control instructions comprises generating, by the at least one computing device, the cut control instructions to cut the panel out from the textile sheet based further in part on the panel cutout.

9. The method of claim 4, further comprising:

instructing, by the at least one computing device, the textile printer to print a machine-readable alignment marker for the panel on the textile sheet, wherein generating the cut control instructions comprises generating, by the at least one computing device, the cut control instructions to cut the panel out from the textile sheet based further in part on the machine-readable alignment marker.

10. The method of claim 4, further comprising capturing, by the at least one computing device, a second image of the textile sheet after the textile cutter begins to cut the panel out from the textile sheet.

11. The method of claim 10, further comprising adjusting, by the at least one computing device, the cut control instructions based in part on the second image.

12. The method of claim 4, further comprising:

assigning, by the at least one computing device, a unique identifier for the panel in the aggregated textile panel template; and instructing, by the at least one computing device, the textile printer to print a machine-readable representation of the unique identifier for the panel on the textile sheet.

13. The method of claim 4, further comprising:

identifying, by the at least one computing device, the panel on the textile sheet from among the plurality of panels in the aggregated textile panel template based in part on a unique identifier printed on the textile sheet for the panel; and instructing, by the at least one computing device, a transfer of the panel into an assembly tote based in part on the identifying.

14. A system, comprising:

a textile cutter; and at least one computing device communicatively coupled to the textile cutter over a network and configured to perform a method comprising:

capturing, by the at least one computing device, an image of a textile sheet on the textile cutter, the textile sheet including a panel for a textile product and a print pattern printed over the panel;

identifying a shift in orientation of the print pattern on the textile sheet with reference to the image of the textile sheet;

generating, by the at least one computing device, cut control instructions to cut the textile sheet based in part on the image and the shift in orientation of the print pattern on the textile sheet; and instructing, by the at least one computing device, a textile cutter to cut the panel out from the textile sheet based in part on the cut control instructions.

15. The system of claim 14, further comprising identifying, by the at least one computing device, a panel deformation of the textile sheet on the textile cutter.

16. The system of claim 14, wherein capturing the image of the textile sheet comprises capturing, by the at least one computing device, a plurality of images of the textile sheet taken from multiple angles.

17. The system of claim 16, wherein the at least one computing device is configured to perform the method further comprising:

triangulating, by the at least one computing device, a cutting path to cut the panel out from the textile sheet based in part on the plurality of images of the textile sheet taken from multiple angles; and generating, by the at least one computing device, the cut control instructions based further in part on the cutting path.

18. The system of claim 14, wherein instructing the textile cutter to cut the panel out from the textile sheet comprises instructing, by the at least one computing device, the textile cutter to cut the panel out from the textile sheet based further in part on a panel cutout printed on the textile sheet.

19. The system of claim 14, wherein instructing the textile cutter to cut the panel out from the textile sheet comprises instructing, by the at least one computing device, the textile cutter to cut the panel out from the textile sheet based further in part on a machine-readable alignment marker printed on the textile sheet.

20. The system of claim 14, wherein the at least one computing device is configured to perform the method further comprising:

capturing, by the at least one computing device, a second image of the textile sheet after the textile cutter begins to cut the panel out from the textile sheet; and adjusting, by the at least one computing device, the cut control instructions based in part on the second image.

* * * * *